(12) United States Patent
Barsade et al.

(10) Patent No.: US 7,398,239 B2
(45) Date of Patent: Jul. 8, 2008

(54) E-COMMERCE SALES AND USE TAX EXCHANGE SYSTEM AND METHOD

(75) Inventors: Jonathan Barsade, 543 Foxglove La., Wynnewood, PA (US) 19096; Tal Elyashiv, Richmond, VA (US)

(73) Assignee: Jonathan Barsade, Wynnewood, PA (US)

( * ) Notice: Subject to any disclaimer, the term of this patent is extended or adjusted under 35 U.S.C. 154(b) by 886 days.

(21) Appl. No.: 10/744,590

(22) Filed: Dec. 22, 2003

(65) Prior Publication Data

US 2004/0230525 A1 Nov. 18, 2004

(51) Int. Cl.
*G06Q 40/00* (2006.01)
(52) U.S. Cl. ............................ 705/35; 705/31; 705/36 T
(58) Field of Classification Search ...................... 705/1, 705/19, 31, 35
See application file for complete search history.

(56) References Cited

U.S. PATENT DOCUMENTS

| | | | |
|---|---|---|---|
| 5,644,724 A | 7/1997 | Cretzler | 395/219 |
| 5,774,872 A | 6/1998 | Golden et al. | 705/19 |
| 5,799,283 A | 8/1998 | Francisco et al. | 705/19 |
| 5,875,433 A | 2/1999 | Francisco et al. | 705/26 |
| H001830 H | 1/2000 | Petrimoulx et al. | 705/31 |
| 6,016,479 A | 1/2000 | Taricani, Jr. | 705/19 |
| 6,078,899 A | 6/2000 | Francisco et al. | 705/19 |
| 6,347,304 B1 | 2/2002 | Taricani, Jr. | 705/19 |
| 6,983,261 B1 * | 1/2006 | Francisco et al. | 705/39 |
| 2002/0052792 A1 | 5/2002 | Johnson et al. | 705/19 |

(Continued)

OTHER PUBLICATIONS

Stephen Kobrin, Territoriality and the Governance of Cyberspace, 2001, Journal of International Business Studies, vol. 32, No. 4, pp. 687-704.*

*Primary Examiner*—Mary Cheung
(74) *Attorney, Agent, or Firm*—Rick Matos; Innovar, L.L.C.

(57) ABSTRACT

The invention provides a system and method for calculating, collecting and/or disbursing one or more third party payments owed to one or more third parties resulting from one or more electronic transactions occurring over a wide area network (WAN) between a customer and a merchant. The transaction concern one or more services and/or products provided by the merchant. The system and method require that the calculation of the amount owed to the third party occur at a WAN node that is different than and at a different locale than that of the merchant. By so doing, the merchant is not required to purchase and install equipment and/or software of the third party to which a payment is due. The present system includes a merchant node, third party payment processing node, financial network, and third party payment receiving node. A consumer conducts a transaction at a merchant node. As a result of the transaction, a third party may or may not be due a payment. The third party payment processing node determines whether such payment is due, calculates the amount of the third party payment, and/or authorizes payment of the third party payment. The financial network, which includes at least the merchant's acquirer bank, the customer's credit card issuing bank and the credit car association, then handles payment of the amount(s) due to the third party, the amount(s) due to the merchant and the amount(s) owed by the customer. The system of the invention can be a fee for service type of system wherein those (the merchant or the third party) that employ the system and/or method pay a fee, for example per transaction or per amounts collected and disbursed, to the provider of the claimed system.

27 Claims, 14 Drawing Sheets

U.S. PATENT DOCUMENTS

| | | | |
|---|---|---|---|
| 2002/0116302 A1 | 8/2002 | Wilmes et al. | 705/31 |
| 2002/0194123 A1 | 12/2002 | Agee et al. | 705/39 |
| 2002/0198832 A1 | 12/2002 | Agee et al. | 705/40 |
| 2003/0055754 A1 | 3/2003 | Sullivan | 705/31 |
| 2003/0061131 A1 | 3/2003 | Parkan, Jr. | 705/30 |
| 2005/0119953 A1* | 6/2005 | Dang et al. | 705/31 |

* cited by examiner

E-COMMERCE SALES AND USE TAX EXCHANGE SYSTEM AND METHOD

FIELD OF THE INVENTION

The present invention relates generally to a system and method of calculating, collecting or disbursing third party obligatory payments imposed upon network transactions, and more specifically, to a system and method of calculating, collecting or disbursing sales and use taxes imposed upon e-commerce transactions conducted over the Internet.

BACKGROUND OF THE INVENTION

Online annual spending exceeded $150BB during FY 2002, a year of economic slowdown, with average sales per online shopper exceeding $1,000 per year, and anticipated to reach $1,500 by FY 2004[1]. Unless an exception exists, the retail components of these transactions are taxable at the point of sale, under the sales tax category. If nexus does not exist to qualify the transaction under the sales-tax requirements, the transaction is taxable at the point of consumer, under use-tax rules.

[1] Marketer, "*US E-Buyers Increase Average Spending by $223 This Year*", (Sep. 25, 2002)

Sales tax is a form of taxation that is imposed upon the purchase of goods and services, and is imposed upon the purchase and leasing of tangible property, unless specifically exempted. Sales tax ordinarily arises when the seller and buyer are in the same state. Use tax is imposed for the storing and consumption of goods and services within the geographic realms of the taxing authority, and is designed as a catchall, to catch those transactions that are not subject to sales taxes. Use tax occurs only when the seller does not have a nexus with the buyer's state.

Sales & use tax are imposed upon the purchaser, however collection and disbursement of sales tax revenue is imposed upon the merchant. Retailers become the governments' agent and are required to collect the tax, on behalf of the states, at the point of sale. If the seller and buyer are not located in the same state, consumers are supposed to pay a comparable "use" tax that is paid to his/her state of residency.

Requiring online retailers to collect sales tax on consumer purchases does not create a new tax on Internet transactions, it merely requires existing taxes to be extended to govern similar transactions, which are conducted via a new means. Consequentially, requiring online retailers to collect these taxes would not go afoul with the Internet Tax Freedom Act, which was initially enacted in 1998, and recently extended through 2005[2]. This moratorium only prohibits imposing new taxes upon Internet related activities (such as Internet access or bit-use taxes), however it does not prohibit the enforcing of existing taxes.

[2] "Sales Tax and Electronic Commerce" (2002 ed), D. Hardesty

Sales taxes (and their foreign equivalents—VAT—Value Added Taxes) are a major funding source for national government operations. In the US sales taxes exceed $180B annually (including state and local jurisdiction taxes, ranging at levels between 5-10% of the transaction amount) and fund approximately 33% of all state tax revenue. In the EU, VAT (with tax rates varying from 15% in Luxembourg to 25% in Denmark or Sweden) accounts for 40% of government revenue[3]. The European Union has issued regulations that would require all businesses, including foreign (i.e. US businesses) to collect European based VAT on on-line transactions. These regulations are scheduled to come into effect Jul. 1, 2003, and will also encompass ASP services, web hosting, sale of downloadable software, electronic books, streaming music, digital movies, computer games and distance-learning services. US suppliers will now have to charge the VAT on transactions where the consumer resides in a EU based country.

[3] The Delaney Policy Group, "*An Examination of Major Policy Issues Affecting Technology Industries and E-Commerce*" (December 2000).

As online activity increases, these government entities are coming to the realization that they cannot afford to forego this revenue source. The problem that they have been encountering to date is that of enforceability and practicability. The US General Accounting Office has estimated that states lose over $12.5BB annually on untaxed Internet transactions[4]. With over 45 states in the US alone which impose sales taxes, and over 7,000 US local jurisdictions with their own individual sales tax rates, and scores of individual nations with even different tax rates, it is easy to comprehend how, in an environment where the consumer and the retailer may be residing in different localities at the time of transacting, imposing collection obligations upon retailers (who might not even know where the consumer is located) would place an undue burden upon online transactions, bringing the Internet to a stagnating halt. By 2006, this loss will triple to $45B, ranging from 2.5% to ~10% of states' total sales tax collection[5].

[4] Research, based upon Forrester Research, Inc. forecasts, predict larger losses, in the range of $13.3B, see "State and Local Sales Tax Revenue Losses from E-Commerce: Updated Estimates," by Donald Bruce and William F. Fox, Center for Business and Economic Research, University of Tennessee, http://cber.bus.utk.edu/econm/ecom0901.pdf

[5] The impact is much larger in foreign countries, which derive major portions of their tax collections from sales and VAT taxes In conclusion, it is reasonable to state that sales taxes (and like-taxes, such as VAT and use taxes) formulate an indispensable component of state revenue. The volume of internet transactions is on the rise, and these are assuming an ever increasing component of the economic environment. As such, local governments cannot forego revenue that could be derived from enforcing sales and use taxes upon on-line activities that parallel those taxes that are imposed upon like-transactions that are conducted off-line.

The very borderless component of e-commerce, that enhance the economic viability of Internet transactions, also increase the complexity of the tax regime because of the multitude of potential taxing authorities—over 7,500 in the US and hundreds more internationally. Merchant compliance of the reporting and collection requirements is low because of the significant resources required to dedicate for complete compliance, including financial, human and technical resources required to implement systems at the point-of-sale, maintain and operate them. Merchants do not have an incentive to comply by implementing point-of-sale systems also because of low levels of government enforcement. Consumer compliance is also low because of the absence of any enforcement mechanism that can impose use-tax compliance during the corresponding product/service distribution.

It is important to develop a system and method that will enable the easy collection and disbursement of sales and use taxes that are to be imposed upon e-commerce transactions. To ease implementation and enhance compliance levels, any such tax collection and disbursement system must be integrated into the current transaction flow, without requiring any changes to the system-flow currently in place. To increase the likelihood of enforcement by the judiciary system, such a system must not place undue burdens upon the merchants who are mandated with the collection and disbursement of the collected tax revenue.

U.S. Pat. No. 5,644,724, to Cretzler, discloses a system and method for the collection and remittance of tax in real time at point of sale locations. The system includes a group of pointof-sale terminals at merchant point-of-sale facilities that review and store tax collection information under merchant control. A bank computer at a merchant bank accesses the stored tax collection information and wire transfers the collected sums periodically to at least one computer at a tax authority bank. For credit or debit transactions, a service computer receives the tax collection information daily from certain ones of the point-of-sale terminals, and wire transfers the credited or debited taxes to the tax authority bank computer.

U.S. Pat. Nos. 5,875,433 & 5,799,283 & 6,078,899, to Francisco & Petschauer, discloses a point of sales tax reporting and automatic collection system including a smart tax register located at a retailer location. The retailer smart register processes consumer transactions and calculates the amount of sales tax due the retailer by the consumer for each transaction. Following the transaction, the consumer requests and is given a tax paid receipt. After the sales tax is paid to the retailer by the consumer, the register either immediately or periodically forwards the amount of the transaction and the amount of sales tax collected by the retailer to a computer and memory located at a remote location (e.g. state government taxing authority). The computer and memory receive and store the retailer's transaction and sales tax information, and periodically report same to the taxing authority. After receiving the retailer's sales tax information, the computer accesses and debits an account belonging to the retailer; the amount debited corresponding to the amount of sales tax collected by the retailer. In sum, the system automatically reports all retailer transactions and sales tax collected by retailers from consumers to local and federal government authorities and then automatically collects the sales tax amounts from retailer accounts so as to prevent retailers from turning over the collected sales tax. A tax paid receipt is given to each consumer as evidence that the tax paid will be turned over to the proper authorities. The systems disclosed in these patents create reports on sales tax and provide means of reporting the tax to the state and federal government. These systems do not, however, address the distribution of these taxes.

U.S. Pat. No. 5,774,872, to Golden, et al, discloses an automated transaction tax reporting and collection system. The system includes individual point of sale terminals disposed at each remote vendor location. The points of sale terminals are networked to a central computer, preferably via a plurality of intermediate data collection sub-stations. Each terminal includes means for inputting and storing data regarding taxable transactions, as well as for storing data reflecting the tax accrued on each transaction. This stored data is collected on a periodic, rotating basis by the corresponding data collection sub-station according to control signals generated by the central computer. All of the collected data is ultimately transmitted to the central computer, which is operative to generate reports reflecting the transaction tax due from each remote vendor location. These reports may then be sent to the taxing authority, the individual merchants, and/or to other taxing authorities, such as the federal government. Preferably, each point of sale terminal also includes a printer that prints an official tax receipt for each transaction recorded.

U.S. Pat. Nos. 6,016,479 & 6,347,304 B1, to Taricani, discloses a system for recovering tax revenue. One implementation of the disclosed invention is to recover tax revenue not being recovered by storing data in a database indicating interstate sales transactions on which a seller does not collect a designated tax, such as a sales tax. This database is part of a computer network which organizes and stores the data in the database and automatically sends out tax due notices to purchasers when data in the database indicates that an interstate sale has taken place and no designated tax has been collected from the purchaser by the seller. This database can also be updated to reflect payment of the tax indicated in the tax due notice, and can automatically remit appropriate revenues to a revenue agency when the tax due notice has been paid. One implementation is also collecting a simplified tax on all interstate sales transactions, and then storing data in a database indicating this collected simplified tax and data as to a revenue agency entitled to the tax based on the purchaser, the state of residence of the purchaser, etc. Based on this data in the database, the collected simplified taxes can be proportioned and routed to the appropriate revenue agency based upon on a pro-rata basis of the seller's sales to the residents of different states.

U.S. Pat. H1,830, to Petrimoulx, et al, discloses a computer implemented system for tax preparation and tax submission enabling accrual and determination of use-tax. The system acquires transaction information, characterizing purchases of goods and services, and uses use-tax accrual and tax-rate logic to generate transaction records and tax information. The system include update logic for periodically acquiring new tax information for a tax rate database to keep tax rate information current. The system also includes sales tax crediting logic so that paid sales taxes can be credited to accrued use taxes.

U.S. patent application, Publication No. 2003/0055754 A1, to Sullivan, discloses a transaction tax compliance system which receives transaction information from selling and purchasing input systems, and returns, stores and reports the tax liability caused by the transaction event.

U.S. patent application, Publication No. 2003/0061131 A1, to Parkan, discloses a system and method for receiving, transforming, analyzing, storing and reporting tax and financial information in a computer-based tax information system. The system performs the function of applying tax rules to arrive at adjustments and individual tax liabilities, and the preparation of tax reports, forms and schedules.

U.S. patent application, Publication No. 2002/0052792 A1, to Johnson et al, discloses a system that assesses the taxability of goods or services sold. The system conducts an analysis of products sold or services rendered either online or offline, and provide the seller with the ability to monitor the tax status, including tax rates of any goods or services sold in any number of taxing jurisdictions. The system includes a master, shared, third-party data-base, compiled from a plurality of client databases, which links uniform commodities code technology, such as UPC, to tax assessment information for goods and services sales transactions made by any number of merchants in potentially unlimited taxing jurisdictions. The system generates and files tax reports.

U.S. patent application, Publication No. 2002/0116302 A1, to Wilmes, et al, discloses a transactional tax settlement system for use with a personal communication device. The system determines a taxing authority and calculates a tax rate imposed by the taxing authority in a communication network environment. The system may be used to determine a tax authority and corresponding tax rate for a buyer/seller transaction over a network, such as the Internet. The system includes a tax information system for determining the taxing authorities and corresponding tax rates by evaluating factors pertaining to the transaction such as, location, tax status, and transaction description. In addition, the tax information system may validate a payment modality, collect taxes, and account for the transaction U.S. patent applications, Publications Nos. 2002/0194123 A1 and 2002/0198832A1, to Agee et al, discloses a system and method for collection and distribution of taxes. The disclosed embodiments of the invention provide a system and a method for point-of-sale collection and distribution of sales taxes on a frequent, regular basis, such as daily or weekly or other periodic time intervals, that can be used for e-commerce transactions. The disclosed embodiments provide a system and a method for transferring funds from numerous merchants to numerous taxing authorities in an efficient manner, with each merchant seeking to transfer funds to perhaps several taxing authorities and each taxing authority seeking to receive funds from many merchants.

Several companies provide products and services with a purpose to assist merchants in their compliance with sales tax collection requirements, by either providing tax calculation services, or tax compliance services. These services typically include providing prepared forms for the merchant to file with the tax payment, or creating a merchant account from which tax payments are disbursed to the taxing authorities. All of these systems require implementation by the merchant at the point of sale, imposing a burden upon the merchant, forcing them to dedicate financial, technical and human resources for system implementation and management. Consequently, compliance is still at very low levels. Most of the existing solutions charge license fees, transaction fees, or both. This further decreases compliance levels. Charging fees from the recipient of the tax collection, rather than from the payor, the merchants, will increase compliance levels accordingly.

No system exists that offers functionalities that assist consumers in their compliance requirements with use tax rules. The claimed invention is the only known service that will enable enforcement of compliance with use tax rules with the same ease as for the enforcement of sales tax rules.

The systems known in the industry that operate in the sales tax venue can be broken down to the following main categories:

Home-grown systems: Very small and very large companies have both been inclined to develop their own systems for online tax compliance. A small seller is likely to be collecting tax in only one state, and is likely to perform some self-programming functionalities to enable collection of local sales tax. Very large companies, especially those with worldwide operations, may develop proprietary custom tax collection systems, suited to their own needs. However, these are extremely complex and costly to develop, let alone maintain.

Tax Compliance Software: Most companies that seek to be compliant, license a commercial solution. The company can license the program directly from its developer, or as part of a shopping cart/billing system—one component of a comprehensive online order-entry system. The following providers are known to offer sales tax software licenses to a broad range of companies:

RIA InSource (http://www.riahome.com)

Taxware (http://www.taxware.com)

Vertex (http://www.vertexinc.com).

A standalone license can be relatively expensive to license, integrate, operate and maintain. The advantage of a standalone license is the ability to configure it specifically to the needs of the merchant, the licensing entity. However, a standalone license requires a fair amount of in-house maintenance. So, a good size budget must be allocated to the tax function. An alternative method is that of sublicensing tax compliance software through a commerce service provider (CSP). A CSP is a company that hosts websites on its servers, and as part of the service makes available a selection of e-commerce order processing software packages, including some kind of sales tax compliance capability, usually provided by one of the major providers listed above.

Application Service Providers: Sales tax application service providers (ASP) are online companies that perform tax calculations on behalf of Internet-based sellers. Sales Tax and Electronic Commerce Sales information is taken by the Internet-based seller, and passed to the ASP, where tax calculations are made. The resulting tax amount is sent back to the seller, where it is used to complete the transaction. In some cases an ASP will merely calculate the tax and send that information back to the seller. In others, the ASP can collect the tax and remit it to state and local tax collectors as well, thus relieving the seller of the entire tax collection and remittance burden. ASPs that are known in the industry to offer services to online sellers include:

eSalesTax (http://www.esalestax.com)

Sales Tax Clearinghouse (http://www.thestc.com)

ASPs relieve the seller of a substantial economic and human resource burden. Some ASPs charge on a per transaction basis, relieving the seller of substantial fixed fees and upfront costs; or the service may be free. On the other hand, if the Internet is slow, or if the ASP develops bottlenecks, transaction-processing time can be impeded. One provider is known to be currently testing a system in which it is offering merchants the ability to integrate tax calculation and collection services. These services are provided at the merchant level. The eSalesTax system performs the tax collection services by debiting bank accounts that the merchants open for the benefit of the service provider, into which the merchants deposit sums that are dedicated to cover sales tax obligations. The tax collection method is not automated in that it is not integrated into the transaction flow of funds. Consequently, there is a loss of control by the merchants over the payment process. This could lead to a need to increase the levels of management and control resources required by the merchant, as well as to transaction complication. For example, if the transaction is reversed by the consumer, the merchant will need to proactively perform a parallel reversal and request a debit from the service provider, a process the provider will not be able to perform in as seamless and easy a manner as can be conducted when the tax collection process is integrated into the fund transfer process, as is the case with the claimed invention.

As listed above, several products and services are currently known that assist in the calculation of sales tax. However they are all implemented at the point of sale, which require merchant compliance, and dedication of significant resources (financial, technical and manpower) for implementation, maintenance, upkeep and operations. They are, with the exception of esalestax.com also relegated to tax calculation and form completion tasks only, and do not provide fully integrated tax collection and disbursement functionalities. All of the systems known, even those that are moving in the direction of providing a more comprehensive service, are rendered at the point of sale, and the tax collection component is not integrated into the fund transfer processes. These lead to significant limitations when compared to the benefits achieved by the claimed invention.

All of these inventions require significant actions to be performed by the merchant at the point-of-sale in order to perform the different actions of calculating, collecting and disbursing sales taxes. As inventions that focus upon the merchant's point-of-sale, the prior systems do not typically enable the calculation, collection and disbursement of use taxes, actions that are imposed upon the consumer, by a third party system. Accordingly, a need remains for a system and method that would ease or entirely remove the burden from the merchant for sales tax actions, and from the consumer, for use tax actions, enable the calculation, collection or disbursement of taxes.

SUMMARY OF THE INVENTION

The system and method of the invention seeks to overcome the disadvantages inherent in the conventional systems and methods for the calculation, collection and disbursement of sales, use and other taxes imposed upon Internet related transactions. The present invention discloses the system and method according to which the actions of calculating, collecting or disbursing sales or use taxes are performed at phases of the e-commerce transaction that are not the merchant's point of sale, such as, by way of example, on the systems of the merchants' gateways, the acquirer merchant bank, the credit-card associations or the issuing bank. By disclosing a system and method that removes the actions of calculating, collecting or disbursing of taxes owed on given transactions from the merchant to other participants in the financial authorization and collection phases of the transaction, the disclosed invention alleviates the burdens placed upon the merchants and the consumers for calculating, collecting or disbursing of sales and use taxes, thus creating a system that is sufficiently easy and reasonable to implement and enforce. This present invention can be used for the calculation, collection and disbursement of other, non-tax related, third-party fees payable upon on-line transactions.

Among the competitive advantages of the claimed invention over these known systems are the following:

(1) Prior art systems are limited to point of sale integration, thus,
   a. requiring the dedication of significant human, financial and technical resources for implementation and maintenance of these systems;
   b. placing the responsibility for maintaining compliance through frequent updates of POS solution on the merchants; and
   c. requiring direct business relationship between the tax service provider and the merchant, raising complexity of marketing, sales, and operations, thus increasing operational cost and impeding proliferation.

(2) Prior art system performance depends on Internet performance and availability. Prior art systems require more than double the number of communication transactions to be performed for each transaction, relying upon the merchant to acquire sufficient servers and bandwidth to handle the extra traffic. By integrating the claimed invention within the transaction flow, tax related functionality will not require additional system performance by the merchant, and thus will not impede transaction flow.

(3) Prior art Point-of-Sale systems require an automatic draft from merchants accounts, which, as described above, would be a deterrent for many merchants, and which complicates debits arising from transaction reversals, etc.

(4) Prior art systems charge merchants license fees, per transaction fee, or both. The claimed invention would generate its revenue base from the recipient of the tax revenue, rather than from the payor.

The invention provides a method for calculating at least one third party payment owed to a third party, the payment being owed as part of a wide area network transaction between a first party located at a first node of the network and a second party located at a different second node of the network, the method comprising the steps of:

generating an information packet on a first computer system of the first party, said information packet containing transaction data;

transmitting said information packet to a second computer system of the second party;

determining whether or not said transaction data contains third party payment data and, if not, adding third party payment data to said transaction data; and transmitting to a third computer system transaction data including third party payment data.

The invention also provides a method for calculating, collecting and disbursing one or more third party payments owed to one or more third parties resulting from one or more transactions affected on a wide area network by a customer, wherein the transaction concerns a service and/or product provided by a merchant, the method comprising:

as a result of a customer affecting one or more electronic transactions for a product and/or service of a merchant, generating a first information packet on a first computer system on a first node of a wide area network, said first information packet containing transaction data;

determining on a computer system on said first node of a wide area network whether or not said transaction data contains third party payment data and, if not, adding third party payment data to said transaction data;

generating a second information packet, said second information packet containing said third party payment data;

transmitting said second information packet to a second computer system on a second node of said wide area network; and determining on a computer system on said first node of a wide area network whether or not said first or second transaction data contains one or more amounts owed to one or more third parties; and, if so, subtracting from transaction financial data said one or more amounts owed to said one or more third parties, and transmitting said one or more amounts owed to said one or more third parties; and, if not, not performing any further functionality on said transaction data.

A system of the invention includes a system for affecting one or more third party payments owed to one or more third parties, the one or more third party payments being owed as part of a transaction between a consumer and a merchant, the system comprising:

a merchant node connected to a wide area network, wherein the first node comprises a first computer system for generating an information packet comprising transaction data corresponding to one or more transactions between the merchant and a consumer and for transmitting said information packet to a different second node;

a different second node connected to the wide area network for determining whether or not said transaction data contains third party payment data and, if not, adding third party payment data to said transaction data and for transmitting transaction data containing third party payment data to a different third node; and a third node connected to the wide area network for receiving the third party payment data.

Specific embodiments of the invention include those wherein: 1) said wide area network is the Internet; 2) said third party is a government agency; 3) said third party payment is a tax owed to a government agency; 4) said taxes are selected from the group consisting of sales taxes, use taxes and value added taxes; 5) said inquiry further comprises the step of inquiring whether transaction consumer is exempt from third party payment on said transaction; 6) said determining comprises the step of inquiring whether transaction merchant is exempt from third party payment on said transaction; 7) transaction merchant data is added to said transaction data; 8) said third party payment is calculated based upon transaction data contained in said information packet; 9) said calculation is performed by applying a predetermined mathematical formula; 10) said third party can directly modify said mathematical formula; 11) said information packet is generated by a billing software; 12) said first computer system is a merchant system or an Internet Payment Processing Gateway system; 13) said second computer system is selected from the group consisting of an Internet Payment Processing Gateway system, a credit card association system, and a banking system; 14) said banking system is a credit card issuing bank or a merchant acquirer bank; 15) said third computer system is selected from the group consisting of an Internet Payment Processing Gateway system, a credit card association system, and a banking system; 16) said banking system is a credit card issuing bank or a merchant acquirer bank; 17) said financial data constitutes data for the transfer of funds; 18) said transaction constitutes a credit card transaction; 19) said transaction constitutes electronic payment transaction; 20) said transaction constitutes an e-commerce payment transaction; 21) said first computer system is that of a banking system; 22) said banking system is a credit card issuing bank or a merchant acquirer bank; 23) said first computer system is selected from the group consisting of a credit card association system, an Internet Payment Processing Gateway system and a merchant system; and/or 24) said second computer system is selected from the group consisting of an Internet Payment Processing Gateway system, a credit card association system, and a banking system.

Another aspect of the invention provides a system for calculating, collecting and disbursing one or more third party payments owed to one or more third parties resulting from one or more electronic transactions affected on a wide area network between a customer and a merchant, the system comprising:

a first computer system connected in a first node of a wide area network for generating a first information packet as a result of a customer affecting one or more electronic transactions for a product and/or service of a merchant, said first information packet containing transaction data;

a first transmission system for transmitting said transaction data to a second computer system connected to a second node of said wide area network;

a second computer system connected in a second node of a wide area network for receiving and processing said first information packet;

a query protocol residing on said second computer system for determining whether or not said transaction data contains third party payment data and, if not, for adding third party payment data to said transaction data;

a second transmission system for transmitting said transaction data to a third computer system connected to said wide area network;

a third computer system of said wide area network connected to said wide area network for generating a second information packet comprising said transaction financial data and third party payment data;

a third transmission system for transmitting said second information packet to said second computer system connected to said wide area network;

a second query protocol residing on a fourth computer system for determining whether or not transaction financial data contains one or more amounts owed to one or more third parties; and a fourth transmission protocol for transmitting said financial data to said third computer system for subtracting from transaction financial data said one or more amounts owed to said one or more third parties, and transmitting said one or more amounts owed to said one or more third parties; and, if not, performing no further actions on said transaction financial data.

BRIEF DESCRIPTION OF THE DRAWINGS

The following drawings are part of the present specification and are included to further demonstrate certain aspects of the invention. The invention may be better understood by reference to one or more of these drawings in combination with the detailed description of the specific embodiments presented herein.

DETAILED DESCRIPTION OF CERTAIN EMBODIMENTS OF THE INVENTION

The present invention can be utilized in any networked environment in which one or more third parties are entitled to receive certain portions of payments for transactions being conducted in the network between two other parties. Such an environment can encompass the Internet or an intranet, or any other environment in which transactions are processed for authorization or for the transfer of payment data, including the actual transfer of funds through a network communication channel.

The present invention is discussed in the illustrative context of use in the authorization of an online transaction conducted over the Internet, in which the authorization request is processed through an Internet Payment Processing Gateway, providing gateway services to a merchant. The teachings of this invention can be easily incorporated into any similar distributed processing environment.

As used herein, the term "wide area network" means a network comprising plural different nodes of computers, servers and/or gateways, wherein the nodes are communicatively connected and located at different locales. For example, a first party node, a second party node and a third party node are each located at different locales but are connected by a hard-wired and/or wireless system. At each occurrence, a node is a stand-alone component (not part of a local area network) or a component that is part of a local area network. At each occurrence, a node is independently selected from a computer, server or gateway. Exemplary wide area networks include the Internet or telephone networks. In a specific embodiment, a first node is a merchant node, a second node is a payment processing gateway node, and a third node is a payment recipient node.

As used herein, a transmission system is a computer line, wireless, Ethernet, land line, facsimile, Internet, wide area network, local area network, infrared, microwave, radio wave, and/or telephone based system used to transmit information from one computer system to another.

Figure 1:
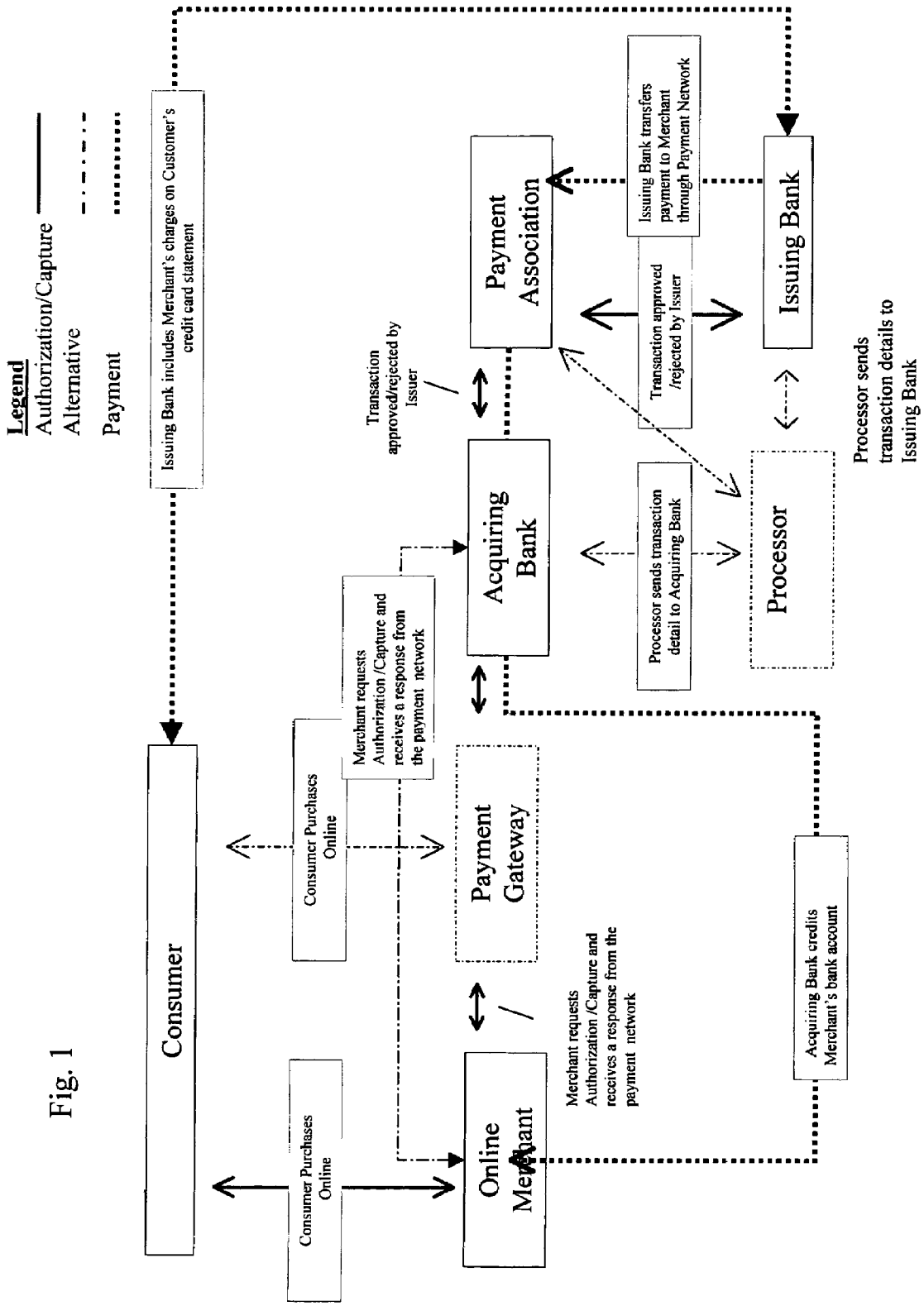
FIG. 1 depicts a high-level block diagram of the standard prior art on-line transaction process.

Authorization Process—FIG. 1 depicts the prior art process in which transaction data is transferred to the acquiring bank. In one embodiment the transaction data is transferred from the consumer to the systems of the merchant, which would then transfer said transaction data to the acquiring bank through a payment gateway. In an alternative embodiment, the transaction data is transferred to the acquiring bank from the Consumer through the payment gateway, without passing through the systems of the online merchant. In yet an alternative embodiment the transaction data is passed to the acquiring bank from the merchant directly, not through the systems of a payment gateway. This prior art may include systems and methods for the calculation of third party payments that are integrated in the merchant node only.

Transaction data is then transferred from the acquiring bank to the issuing customer's credit card issuing bank. The transaction data may be transferred to the issuing bank either directly, through the credit card payment association, or in another alternative, through a third party processor. The ultimate purpose is to obtain confirmation that the customer has sufficient funds to pay for the transaction, that the merchant is authorized to provide the customer with the purchased goods/services, and to obtain assurance that the merchant will be paid at the regular billing cycle.

Oftentimes, a third party gateway may be involved in the early phase of the Authorization Process, providing third party services to the merchant. The Gateway may interact either directly with the customer, effectively bridging between the customer and the merchant bank (acquirer) at the billing authorization phase (so that the merchant is in effect taken out of the loop at this phase, and is provided with transaction data after the effect). Alternatively, the merchant might use software provided by the gateway companies, or other $3^{rd}$ party vendor software, that manages the billing phase of the transaction. Such software might be installed upon, and run from, the server systems of $3^{rd}$ party providers ("ASP") or directly installed and run from the merchants' systems. According to one embodiment, the billing software is installed and run from the node (computer system) of one or more $3^{rd}$ party providers.

FIG. 1 also depicts the fulfillment process typically followed in a standard on-line transaction process. Fulfillment is typically referred to as the process in which a merchant advises a financial network that it has fulfilled its part of the transaction, e.g., shipped a product and/or rendered a service, and the financial network should now dedicate those funds that were captured during the authorization phase to complete the financial settlement phase of the transaction, i.e. transfer the transaction funds from the consumer's account to that of the merchant. A third party Internet Payment Processing Gateway may be involved in the initial phase of transferring the merchants' notice of fulfillment to the financial network. A third party processor may also be involved by transferring funds to the merchant's account and concurrently debiting the accounts of the consumers' bank for the settled transaction amount. The consumers' bank may debit the accounts of the consumer immediately for the complete transaction amount, or, it may issue to the consumer a periodic statement for amounts owed thereby deferring the transfer of funds from the consumer's bank account to the consumer's bank and/or the third party processor.

Figure 2:
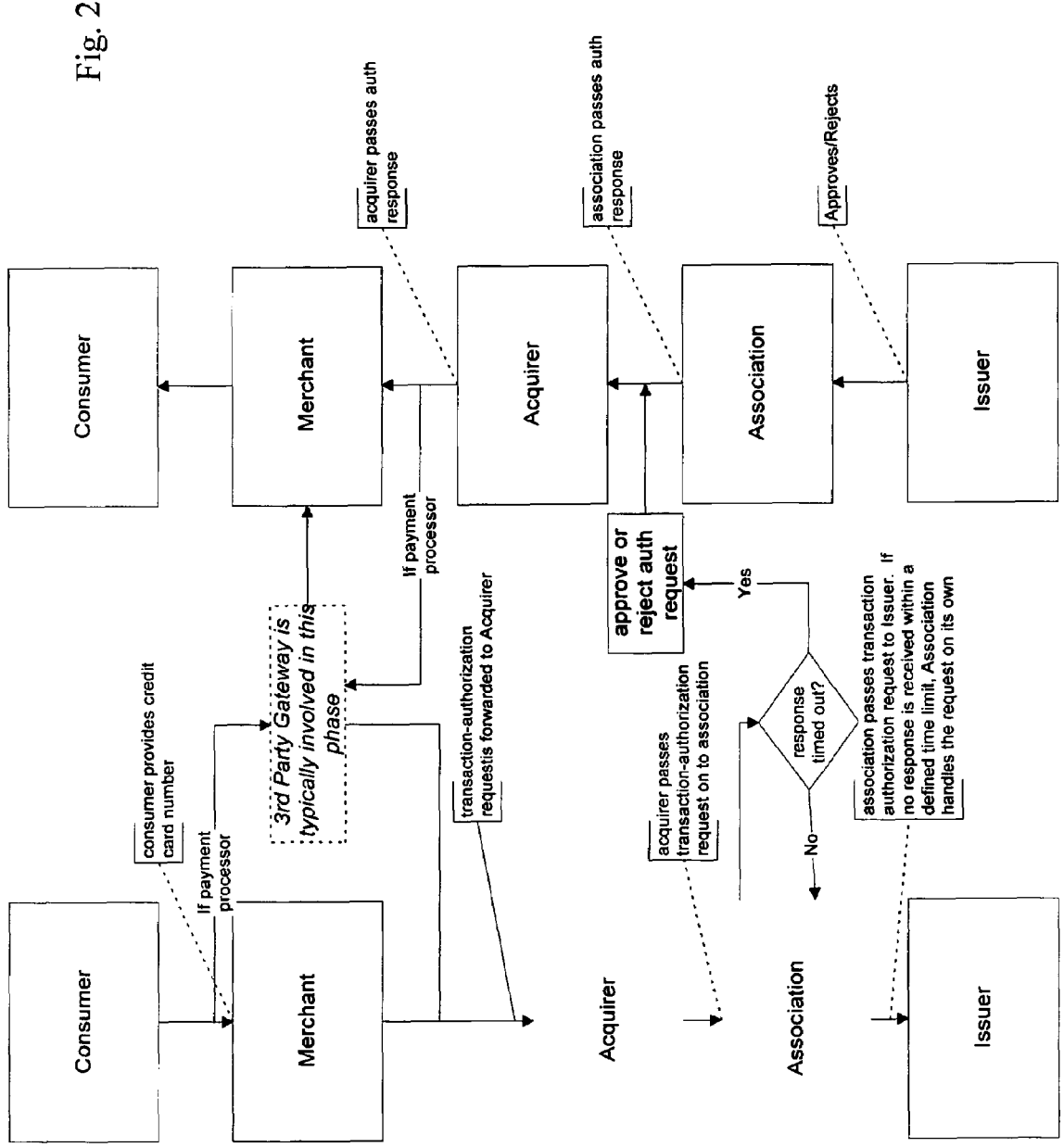
FIG. 2 depicts a high-level block diagram of the standard prior art authorization process followed in an on-line transaction.

FIG. 2 depicts the prior art authorization process typically followed in a standard on-line transaction process. In one embodiment, such a transaction would proceed as follows. The Consumer conducts a transaction on the Merchant's web site. Upon conclusion of the shopping component of the transaction, the Consumer would exit the "shopping cart" phase, and be transferred to the Authorization Process phase. In the Authorization Process phase, in order to complete the transaction, transaction data is transferred to the check-out component of the system, including transaction amount. The Consumer provides their credit card number, as well as other verification information (name, billing address, contact information and optionally other identification and/or security data, etc.) ("Transaction Data").

The Transaction Data is forwarded via a transaction-authorization request to an Acquirer in a process as depicted in FIG. 1, such as via a $3^{rd}$ party payment gateway. The request includes the credit card number and other transaction related data, and may include security information, date, Merchant information and transaction amount. This amount may include sales tax or use tax if the Merchant has implemented a sales tax collection system within their internal transaction system. The transaction authorization request is then forwarded from the Acquirer Bank to the Issuer via the Association. Upon issuance of an authorization response by either the Issuer Bank or the Association, the response is returned to the Merchant, via the Acquirer and the Gateway. The Merchant will then conclude the transaction with the Consumer based upon the transaction-authorization response received.

If the transaction involves soft-goods (such as software, music file, video file, graphic file, text file, etc.) that are downloaded over the Internet upon authorization, capture and fulfillment requests may be initiated immediately upon conclusion of the authorization transaction. The merchant can incorporate deposit (fulfillment) requests together with the authorization request. Typically, if the transaction involves hard goods (such as articles, products, items, etc.) that are to be shipped from the Merchant, the fulfillment request may not be issued until the day the goods are actually shipped.

The prior art system described in FIG. 2 may include a system and method for the calculation of third party payments that are integrated in the merchant node only.

Figure 3:
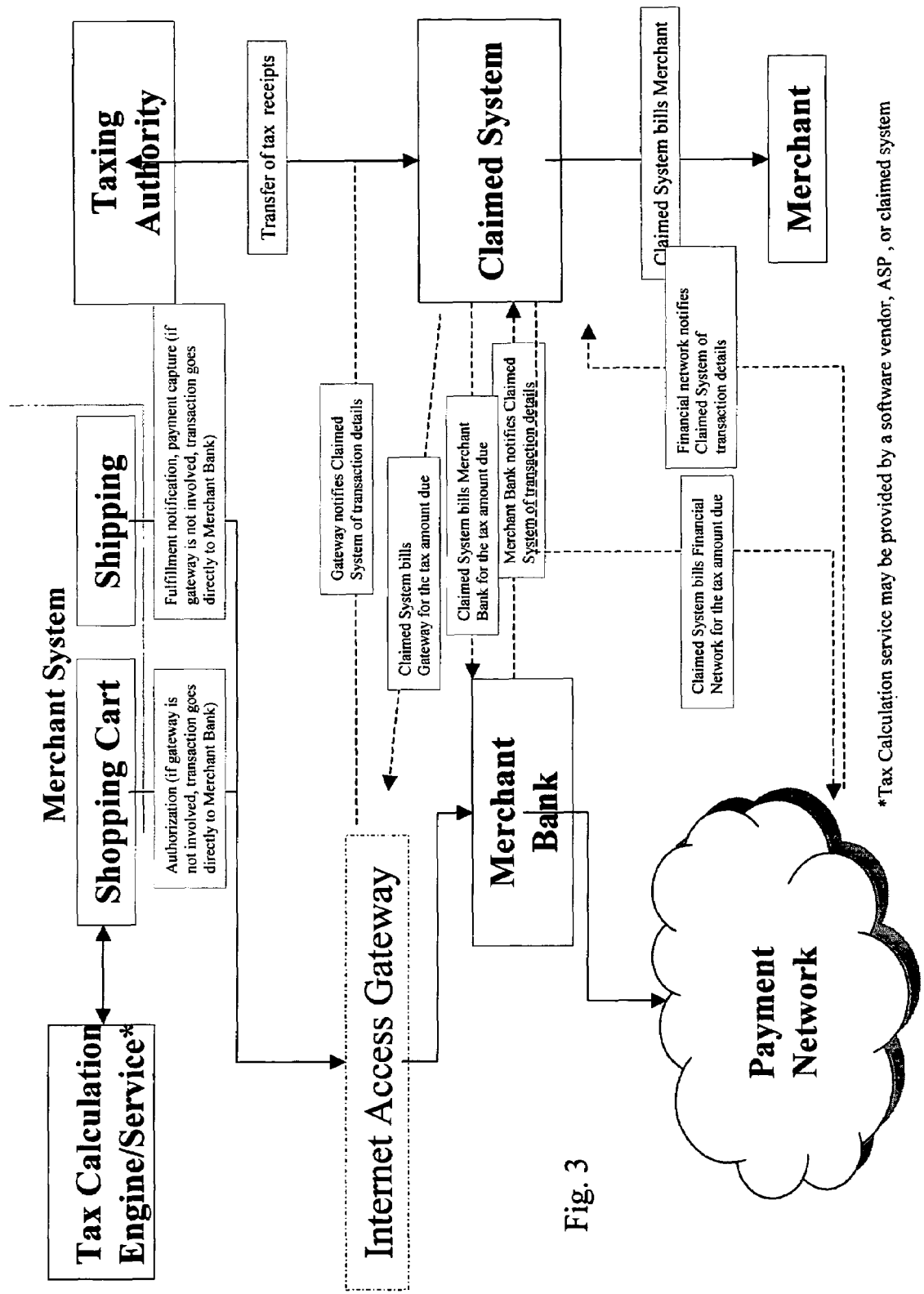
FIG. 3 depicts a high-level diagram of an illustrative environment, implemented through the Internet, which embodies the teachings of the present invention along with basic inter-computer actions that occur in that environment and associated processing operations.

In FIG. 3, an explanation is provided of the different systems and participants that participate in one embodiment of on-line transaction authorization and settlement processes when the claimed invention is integrated for purposes of calculating, authorizing or collecting and disbursing taxes owed to a third party. For simplicity and consistency, reference will be made throughout to these participants:

A third party may or may not be due a third party payment that occurs as part of one or more transactions between the consumer and merchant. The system and method of the invention is capable of determining whether or not a third party payment is due to one or more third parties as part of the transaction between the consumer and merchant. A third party can be any party to which an amount is owed as a result of the transaction. In a specific embodiment, the third party is a government agency and the third party payment is a tax. In another specific embodiment, the third party may be the owner of a telephone network, and the third party payment is a commission owing to the network owner on transactions conducted via the network.

The Consumer is the end user who is making an on-line transaction. As used herein, the term "consumer" is a person or business that obtains a service and/or good from a merchant by way of one or more transactions. A consumer can obtain the service and/or good by purchasing, leasing, renting, or providing some form of consideration for receiving and benefiting from the service and/or good. The consumer is typically the party who is responsible for the sales and use tax, and who, typically, by law, is responsible for reporting and dispensing of use tax. The consumer may be the party that interacts with the merchant shopping-cart for purpose of concluding an online transaction.

The Merchant is an on-line retailer with whom the consumer typically interacts for the online transaction. As used herein, the term "merchant" is a person or business that provides a service and/or good. The merchant is usually the party who is responsible for collecting and dispensing of sales tax. The Merchant's shopping cart and shipping systems will usually interact with the third party Internet Payment Processing Gateway systems. The Merchant will usually also be the recipient of funds transferred for payment on account of the underlying transaction. Funds are usually received directly into the Merchant's accounts managed upon the systems of the Acquirer bank, and are not transferred through the Internet Payment Processing Gateway.

The Internet Payment Processing Gateway is usually an on-line third party that would provide a gateway from the on-line presence of the merchants into the financial networks, typically the Acquirer bank and the credit-card processors (akin to the credit-card swiping machine that is encountered at the retailer's physical store, and that its sole function is to connect the merchant to the credit-card processor). Gateways may render their services by providing either:

(i) Direct processing services—the merchant merely displays the Gateway's transaction page, which is actually hosted on the gateway's secured server. The customer inputs their transaction information directly into this page, i.e. directly into the systems of the gateway; or (ii) Processing software that the merchants integrate into their own systems, and which they use to enable their systems to interact directly to the processor and the merchant bank. In this method, the customer inputs their transaction data into the systems of the merchant, which is then transferred to the gateway or to the processing bank.

The Gateway may provide the merchant's software modules (COM components) that collect the credit card and billing information, and capture the customer's transaction data from the merchant's secured page, connect and transfer the data to the gateway's systems The Acquirer is the bank of the Merchant through which the Merchant submits its request for transaction authorization and approval, and from which the Merchant receives the ultimate transaction payment. The Association is the credit card organization or business that serves as a clearing-house for transaction authorization and payment.

The Issuer is the bank of the Consumer, which issues and maintains the consumer's credit card account and through which the consumer receives credit, account information, service, and makes transaction payments.

FIG. 3 is a depiction of the systems, and their components, that participate in one embodiment of the claimed invention. The consumer enters the shopping cart phase of an on-line transaction on a merchant's website on the Internet. The merchant's computer system obtains tax calculation from a tax calculation engine, and payment authorization from the financial network. Tax calculation engine can be installed on the systems of the merchant, or in the alternative, on a $3^{rd}$ party provider, including those of the claimed invention. As part of the transaction data received by the Gateway, the merchant's computer system verifies shipping information (confirmation of shipping or of intent to ship) and sends fulfillment notification and payment capture data to the Gateway. The Gateway, in turn, forwards the authorization and fulfillment data to a credit card financial network, which in one embodiment comprises the merchant's bank, the association, and the customer's issuer bank. When appropriate, funds are then transferred to the Merchant in payment of the good and/or service obtained by the customer, and the customer is billed by the issuer bank for payment made to the merchant. An alternative embodiment would include a scenario where tax calculation services are requested by the systems of the Gateway in relation to the transaction and forwards authorization, fulfillment and payment capture data to the system of the claimed invention (see below) that determines the tax due to a taxing authority, transfers tax funds to the taxing authority and send and invoice to the merchant for amounts owing.

Figure 4:
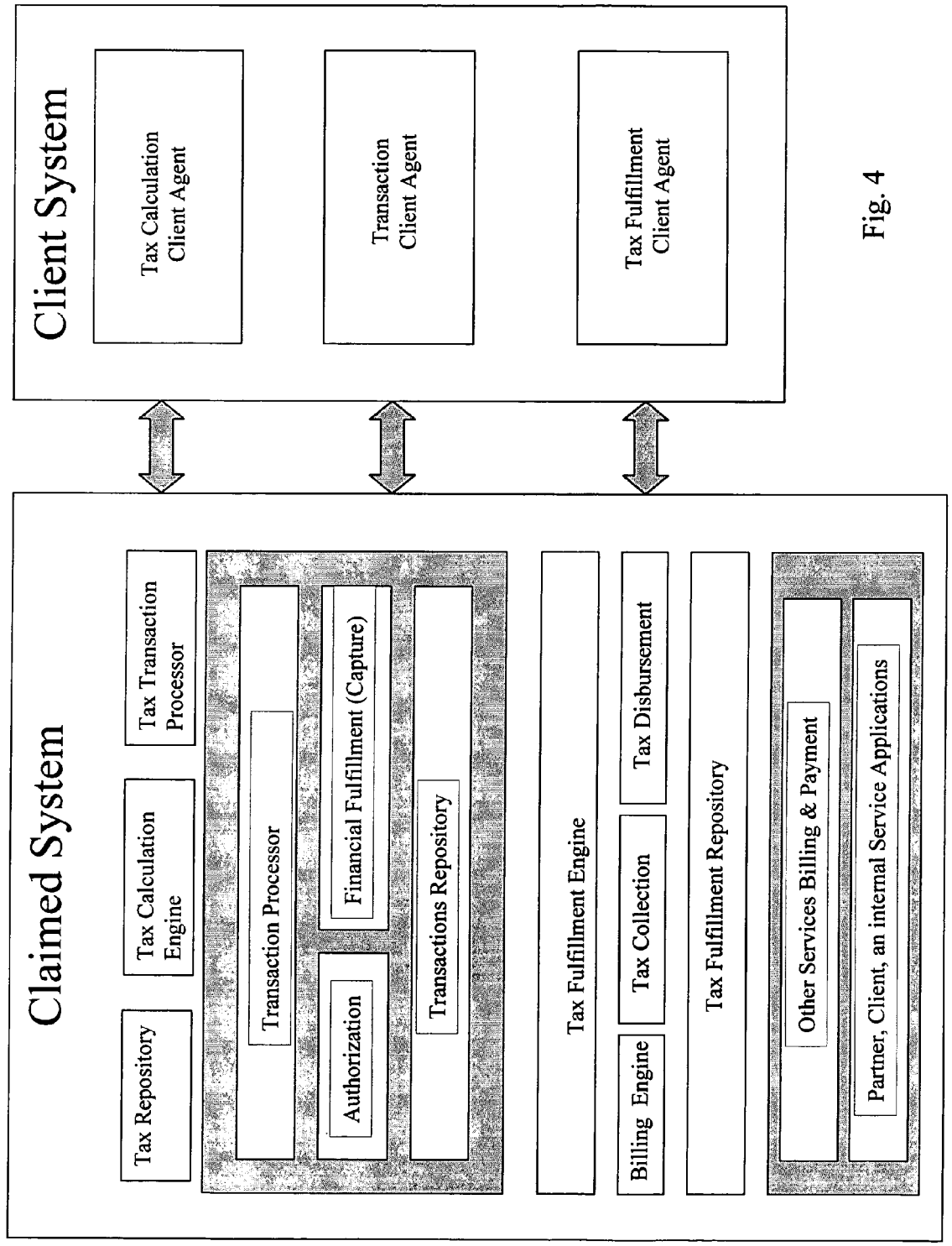
FIG. 4 depicts a simplified high-level diagram of application programs resident within invention systems.

FIG. 4 describes an embodiment of the components of the Claimed System. As an online sales-tax system, the Claimed System will typically have a tax transaction processor, that will include a tax calculation engine. The Claimed System will also include a repository data base, a transaction processor for Authorization and Capture transactions, tax collection and fulfillment engines, that will include a billing engine, and tax collection and disbursement collection engines.

As used herein, the Client Agent is a software element that bridges the client system and the system of the claimed invention. The Client Agent is used in situations where the system, which uses the services offered by the claimed invention ("client system"), maintains an independent state from the systems of the claimed invention. In such scenarios, a bridge between the two systems is required, that will enable high frequency, highly scalable communications between the two systems. In the phase in which the transaction is obtaining authorization from the financial network, the function of the Client Agent would be to intercept transactions that enter the client system, transfer them to the system of the claimed invention, undergo functionality defined by the claimed invention, and return the transaction data to the client system. In one embodiment, such functionality includes calculation of tax rates or the registration of the transaction in the system of the claimed invention, for further processing at a future time period. The Client Agent may also intercept the response received from the authorization process, and process the response according to criteria defined by the system.

A Tax Fulfillment Client Agent may also reside on a client system. Its function would be to intercept transaction data for the transfer of transaction funds, pass such payment data to the systems of the claimed invention for processing. Such processing may include the filtering out of third party payment obligations. By utilizing a low impact client agent, the claimed invention can seamlessly provide the complex functionalities offered by the system, such as authorization and fulfillment, without having any adverse impact upon current and accepted online transaction protocols and specifications, enabling a quick, efficient and non-costly integration of the claimed invention into different client systems As used herein, the Claimed System is the system engine of the claimed invention that performs substantially the full scope of functionality provided by the invention systems. In one embodiment, such functionality includes the calculation of tax rate and the storing and processing of transaction data for the transfer of funds owing to third parties, such as transaction taxing authorities.

The authorization engine performs some of the functionality required during the authorization process. Information that is received from the authorization process through the Transaction Client Agent is processed, and if needed the transaction processor passes authorization request information to a tax calculation engine. The transaction processor will also cause the relevant transaction information to be saved, then, if tax calculation functionality were also required, fills in the relevant fields on the transaction and passes the revised transaction information back to the Transaction Client Agent. As parts of the authorization protocol are being exchanged between components of the system, the authorization engine receives the corresponding transactions (e.g. authorization request response) and acts according to the business rules relevant to this stage of the transaction. The relevant data from each stage of the authorization request protocol may be persisted and updated in an authorization request repository database for further reference.

Because in some scenarios the transaction client agent is typically integrated in a critical path to the online transaction stream, speed and reliability will usually be critical in order to ensure that the transaction process is not hampered by integration of the present system and/or method into an existing system and/or method.

The tax calculation engine obtains data directly from an online order-entry system (or e-procurement system), calculates the tax, and sends the transaction data, including the tax data, back into the transaction flow. As tax calculation request usually occur as part of an online real-time or near real time transactions, operational requirements of the tax calculation engine may include the ability to perform this functionality at high speed with high levels of reliability. Tax calculation may be performed by obtaining information of the place where the transaction occurs (transaction nexus) and cross-referencing such information with the tax rates prevailing in such nexus. Transaction nexus may include several taxing jurisdictions, such as country, state, county, and city. The tax calculation engine may incorporate consumer and merchant specific data that may impact the tax calculation, such as where the consumer benefits from tax exempt status, or where a tax holiday governs the specific transaction.

The Tax Fulfillment Engine would deal with the collection phase of online purchases, including billing and tax distribution. The tax collection engine may collect sales and use taxes upon related transactions, and disburse the taxes appropriately. Transaction data could also be forwarded to the Fulfillment Engine from the repository database. Tax collection and disbursement services may be performed for standard transactions, in which tax calculation services were rendered, and also for transactions where authorization was not performed using the claimed invention. Tax collection can be performed by either interacting directly with the fund transfer engine, and collecting tax fees as these funds transfer from the Issuer to the Acquirer, or Merchants may be invoiced directly or indirectly for taxes owing.

In an exemplary transaction, while being forwarded for authorization by the issuing bank, transaction financial data of an on-line transaction, would be intercepted by the transaction client agent as it enters into the client systems, such as those maintained by a financial gateway providing Internet gateway services to an on-line merchant. The transaction data would be transferred by the transaction client agent to the Tax Transaction Processor of the Claimed System for tax processing. The Tax Transaction Processor would enable the Tax Calculation Engine to calculate sales taxes owing on the given transaction, and the Authorization Engine would process the transaction for further authorization and fulfillment. The transaction data, together with the tax data, would then be returned to the transaction client agent for authorization by the issuing bank, and would also deposit the transaction data in the tax repository data-base of the Claimed System. At a predefined time interval, the transaction data would be forwarded from the repository to the tax fulfillment engine. This may occur, for example, in response to the transaction data being further intercepted by the transaction client agent at the time that the transaction data is being forwarded by the merchant for financial fulfillment. The tax collection and Client Settlement Agent would process the financial data so that the merchant is properly invoiced for the taxes owing and that the corresponding taxes be forwarded to the tax authorities as required. This transaction flow is further described in FIG. 5.

Figure 5:
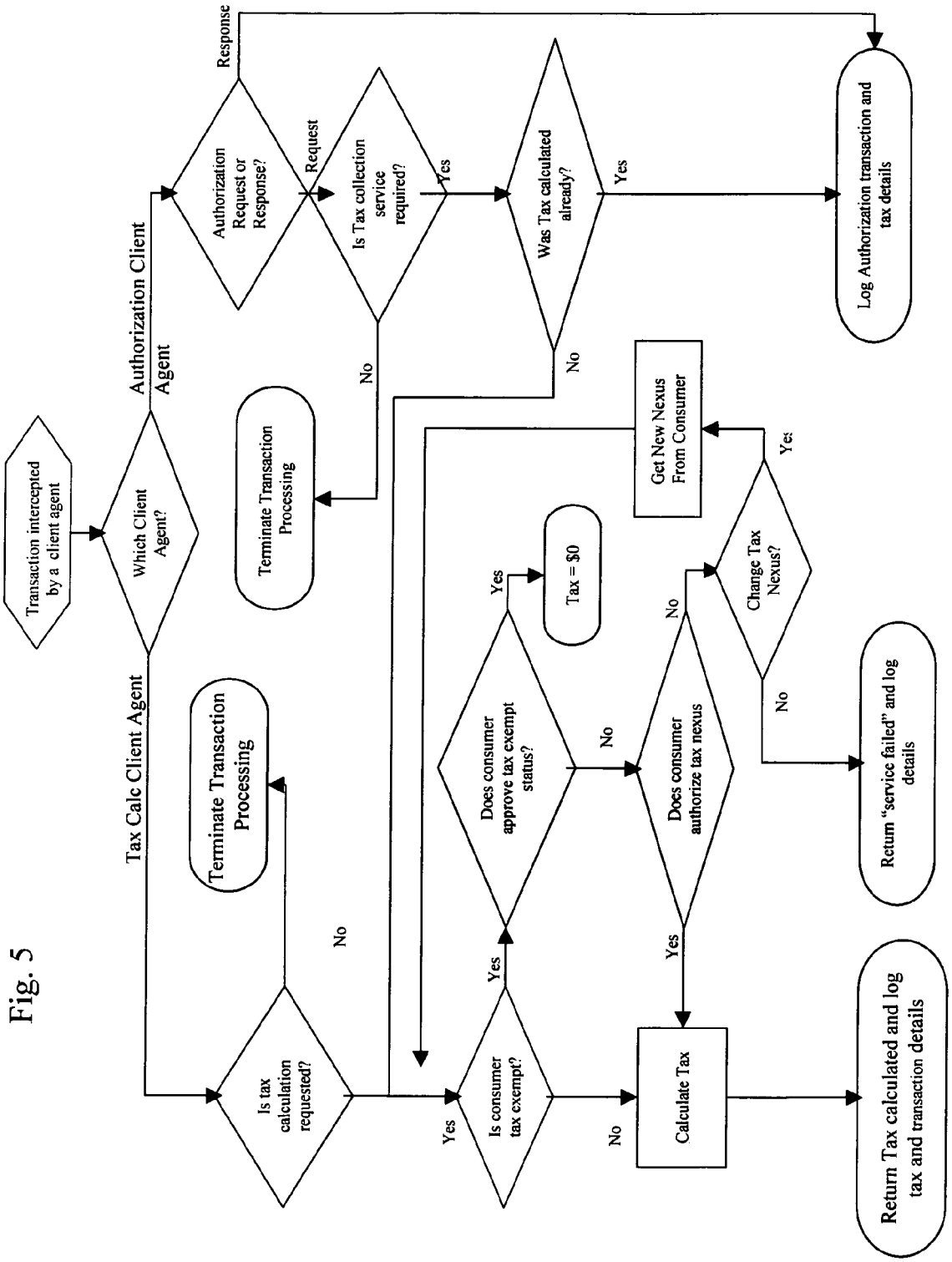
FIG. 5 depicts the process of the disclosed invention for the calculation of sales tax and authorization of the aggregate transaction amount, including sales-tax.

FIG. 5 depicts an example of the process of the invention for the calculation of sales tax and authorization of the aggregate transaction amount, including calculated sales tax as performed by the system depicted by FIG. 4. As illustrated in this figure, the transaction authorization request is intercepted by the transaction client agent further described in FIG. 4. The transaction is intercepted by either the Authorization Client Agent or the Tax Calculation Client Agent. In an embodiment where transaction is intercepted by the transaction client agent of the claimed invention and, after verification that the transaction is of the sort that should undergo processing according to the claimed invention, is transferred to the transaction processor of the Claimed System.

Upon entry of transaction data into the Claimed System, initial screening inquiries (determination) would be made, such as whether or not the transaction has already undergone Claimed System functionality or whether tax calculation is required. Such an inquiry may be, by way of example, verifying whether or not the transaction data includes a previously integrated unique identifier issued by the Claimed System or by way of comparing the unique transaction identifier with a list of transaction identifiers that have previously undergone functionality of the claimed invention. The System may have mechanisms that will prevent performing claimed functionalities more than once on any single transaction. In such situations, the System would terminate processing of the transaction by the claimed invention. Exemplary situations would include the merchant opting out of participation in the Claimed System, the consumer meeting (requesting and/or approving) tax exempt status, and/or other such conditions.

For example, a further inquiry may be made as to whether or not the respective Merchant has opted-out of the System. Merchant's may elect to opt out of certain functionalities offered under the claimed invention if, for example, they integrated external systems for calculating transaction sales tax. Such Merchants may still retain other functionalities offered under the claimed invention, such as, for example, collection and disposition of sales tax proceeds. In such situations, the System would preferably return the transaction to the standard authorization process.

As an additional example, further inquiry (determination) may be made as to whether or not the consumer has registered any tax-exemption. Tax-exemption status may be included in the specific transaction data, or it may be compared to a system database that includes specific tax-exempt data. If pre-existing tax-exempt data is included in the system database, the system may forward to the consumer a request to confirm the tax-exemption for the specific transaction. In such events, if the customer approves tax-exempt status, the transaction is returned to the standard authorization process. If the customer does not approve tax-exempt status, the transaction may continue under the claim system.

If the transaction does not have a previous unique transaction identifier according to the invention, the Claimed System may then create a unique transaction identifier for further tracking and auditing purposes, and system calculations would be performed calculating the respective sales or use tax on a given transaction. The resulting amount would be added to the transaction amount requiring transaction authorization.

An inquiry is then optionally made to obtain further authorization by the consumer of the modified transaction amount that includes the respective tax amounts. If such additional authorization is required, the Claimed System may forward a request to receive such confirmation. If such confirmation is not required, or, if it is required and such confirmation is received, the Claimed System would forward the transaction back to the transaction client agent, to be forwarded for further authorization processing according to the standard authorization process by the credit card financial network (CCN) further described in FIG. 2.

Once the transaction has undergone standard authorization processes, and is returned to the client system, the transaction data may be intercepted by the Authorization Client Agent. An inquiry may be made as to the CCN authorization response pertained to the tax transaction data calculated by the Claimed System. If such authorization pertained to such Claimed System calculated data, the transaction client agent will forward the transaction data to the tax transaction processor of the Claimed System for further processing. Such further processing would include inclusion of the authorization response in the tax repository database for queuing for financial fulfillment at a future defined time period. The transaction data is also returned to the transaction client agent to be forwarded to the merchant and the consumer for notification of the authorization response. In description above, in many cases a proactive call to the transaction client agent may substitute interception and inquiry.

Figure 6:
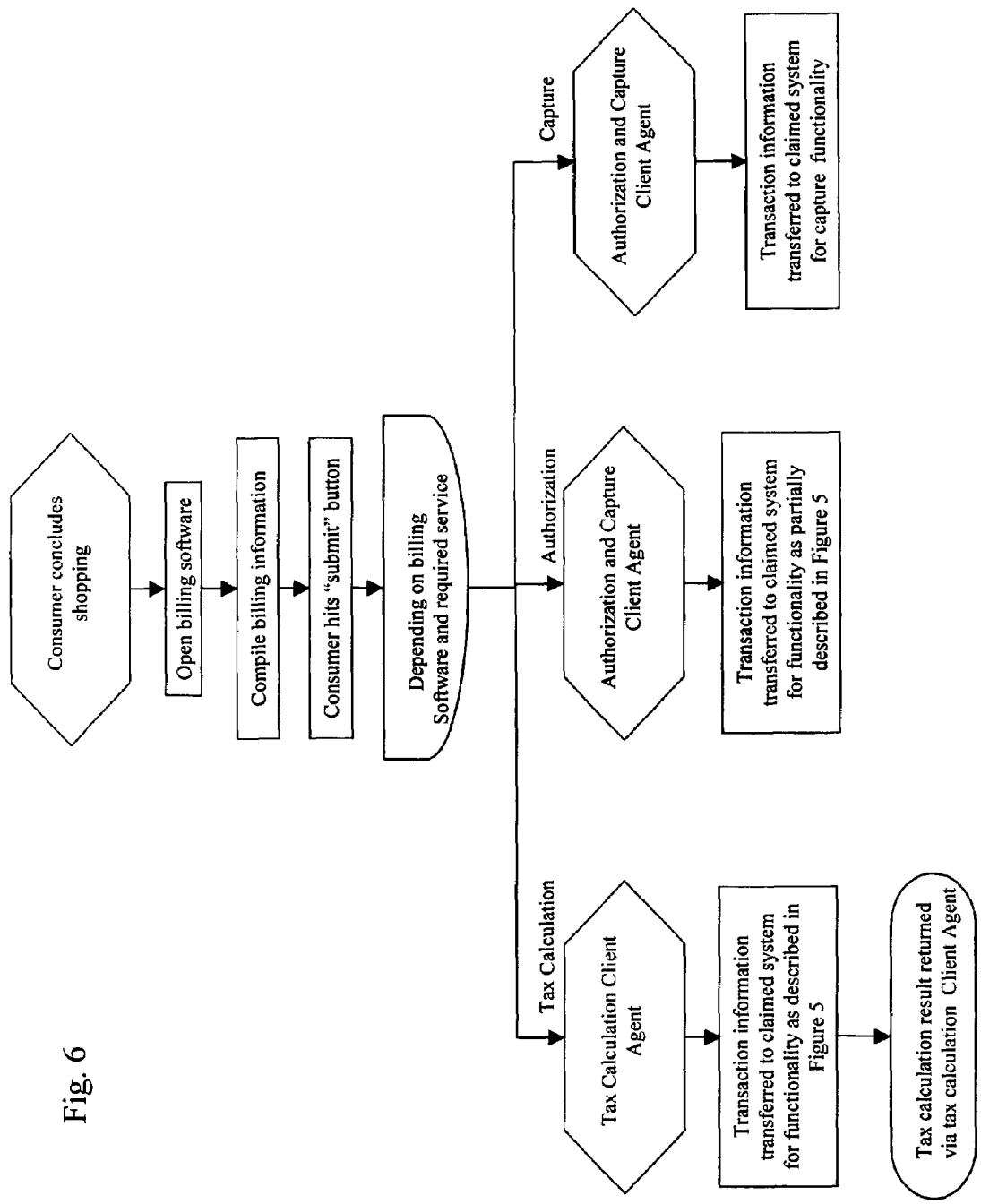
FIG. 6 depicts the process for the integration of the disclosed invention with billing software.
Figure 7:
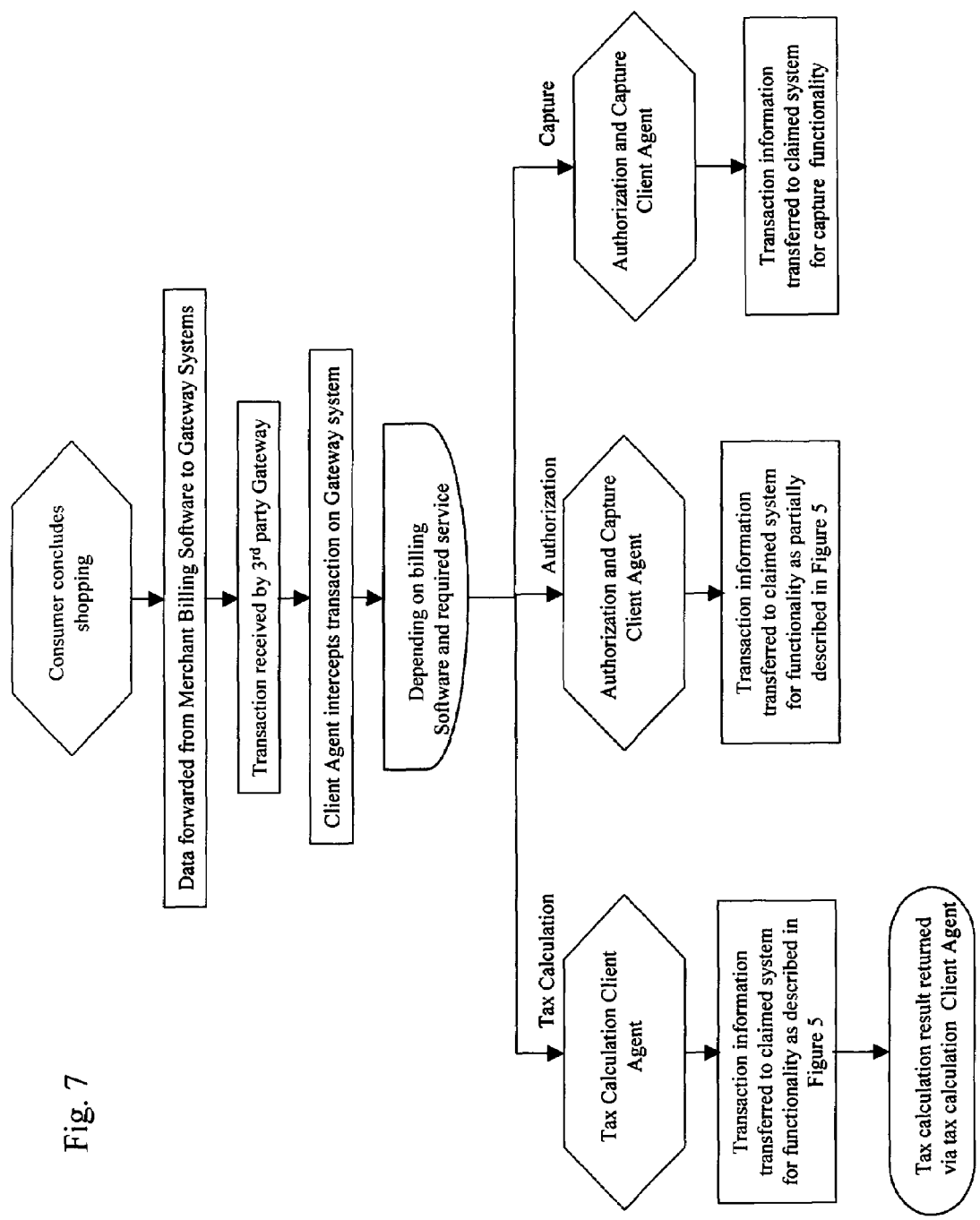
FIG. 7 depicts the process for the integration of the disclosed invention with the systems of $3^{rd}$ party gateway systems.
Figure 8:
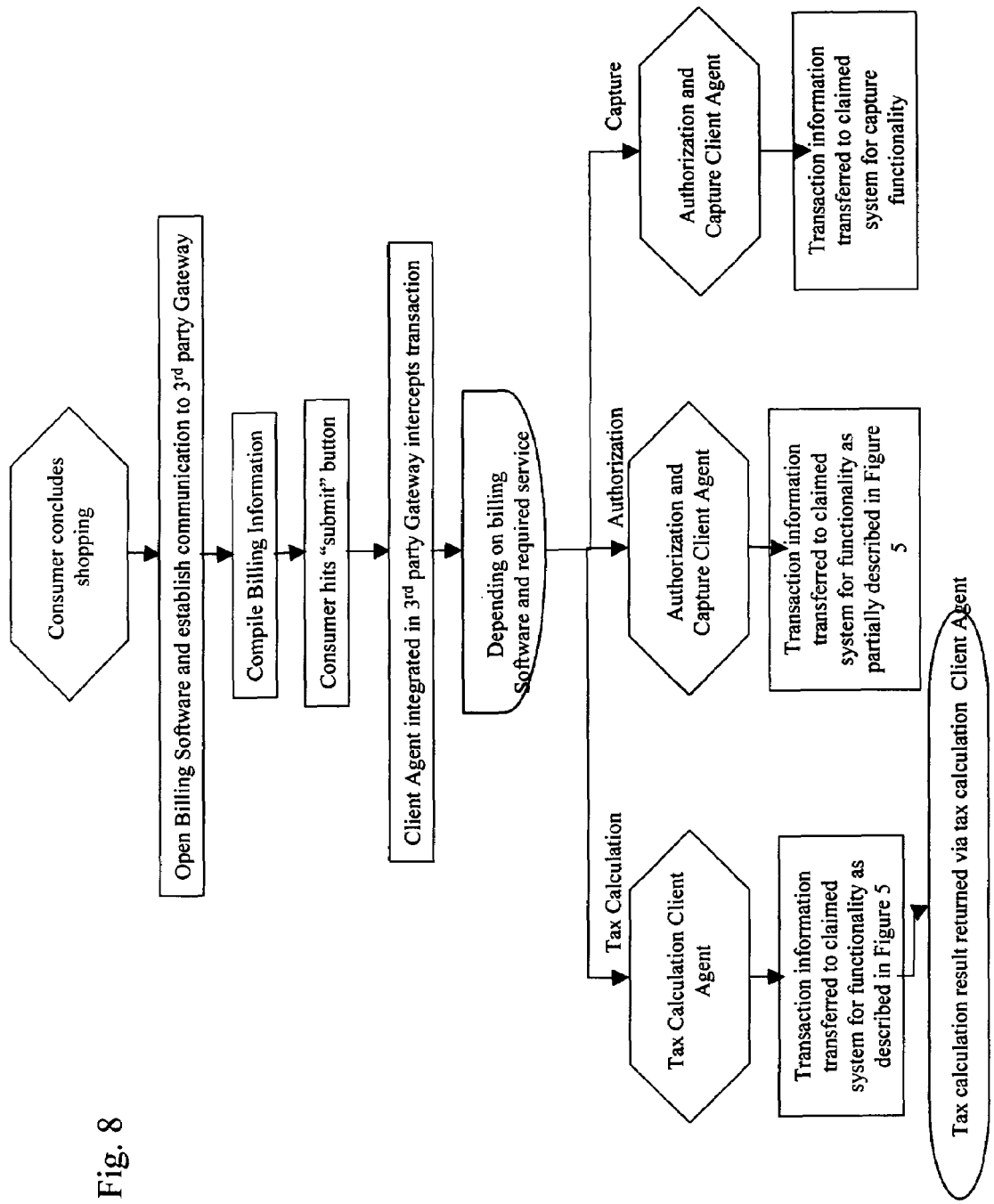
FIG. 8 depicts an alternative process for the integration of the disclosed invention with the systems of $3^{rd}$ party gateway systems.

The claimed invention may be integrated into many different points of the transaction authorization flow. FIG. 6, FIG. 7 and FIG. 8 depict some of the different positions within the transaction flow into which the claimed invention can be integrated. FIG. 6 depicts, for example, the disclosed invention being integrated into billing software. In this scenario, the Claimed System Client Transaction Agent is placed into the billing software, and may intercept the transaction authorization request once the consumer hits (clicks on, activates) the 'submit' button in the graphic user interface of a billing software program. FIG. 7 depicts, for example, the disclosed invention being integrated into the systems of the Internet Payment Processing Gateway or the Merchant bank if payment gateway is not involved, where a billing software program forwards the transaction data to the systems of the Gateway. In this embodiment, the Claimed System Client Transaction Agent is inserted into the systems of the gateway/Merchant Bank, and may intercept the transaction authorization request once the transaction request enters into the systems of the Gateway/Merchant Bank. FIG. 8 depicts, for example, the transaction client agent of the disclosed invention is integrated into the systems of the Internet Payment Processing Gateway where the billing page is hosted in the systems of the Gateway. In this scenario, the Claimed System Client Transaction Agent would intercept the transaction authorization request once the user hits the submit button in the gateway-hosted billing page.

Figure 9:
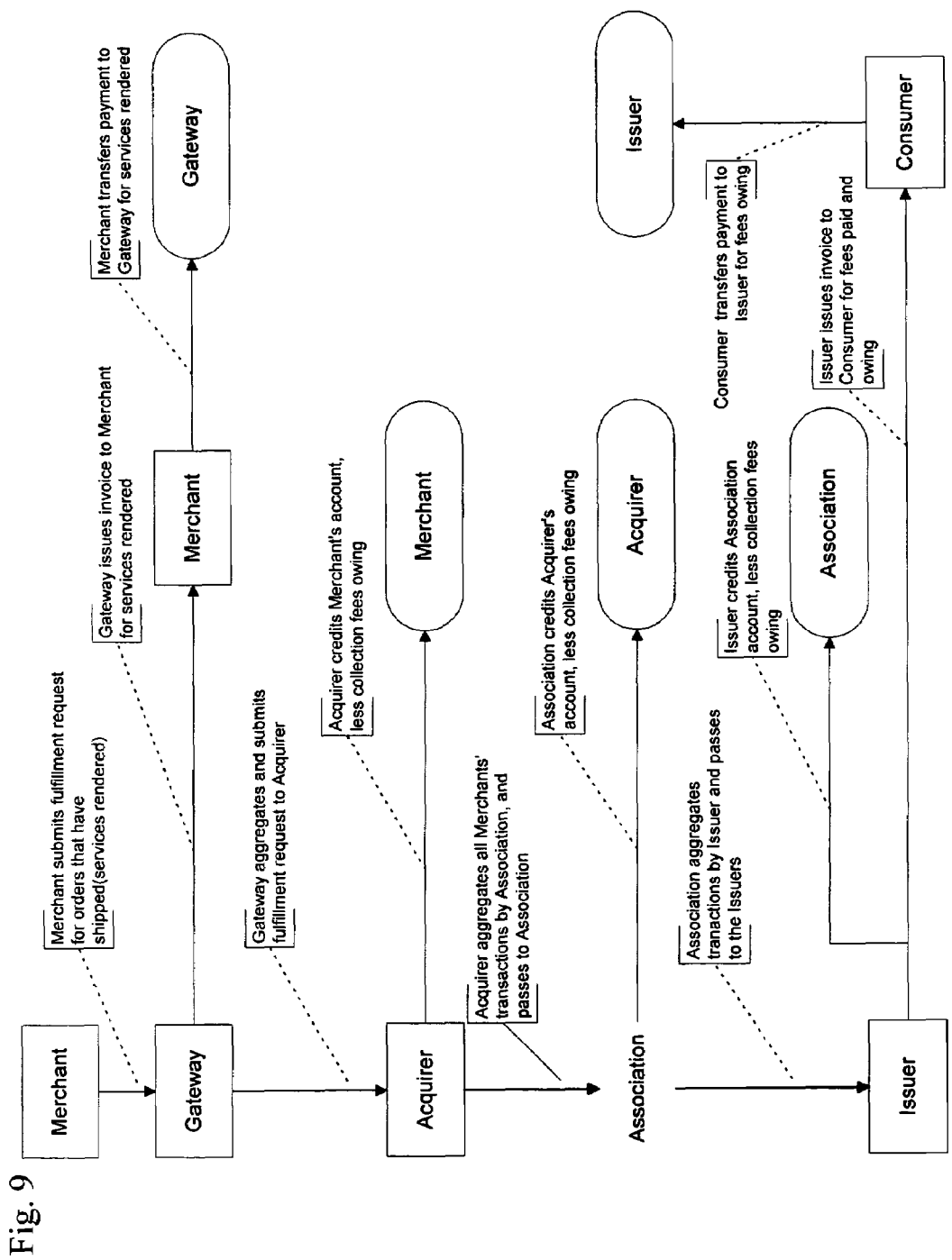
FIG. 9 depicts the standard fulfillment process followed in an on-line transaction of advising the financial network of the transaction fulfillment and commencement of fee collection phase.

FIG. 9. depicts an exemplary transaction flow of the fulfillment request part of the financial transaction, as practiced by the prior art. Upon conclusion of its part of the transaction, a Merchant may submit a fulfillment statement for the amount owed under the concluded transaction. Such requests may be submitted via a third party Internet Payment Processing Gateway, which may batch several requests, and forward them into the financial network, such as the Acquirer Bank. The Internet Payment Processing Gateway might not be reimbursed for their services from the financial network and might instead be reimbursed by way of issuing periodic invoices to the Merchant for services rendered. The Acquirer bank may aggregate fulfillment requests received, and forward them via the Credit Card Association to the issuing bank. The Acquirer Bank may have its accounts credited directly from the Credit Card Association, or in another alternative, receive the requested fees from the Consumer's Issuing Bank. After transferring funds owed on the underlying transaction, the Issuing Bank may issue periodic invoices to the Consumers for fees owed or may deduct fees owed directly from the account(s) of the Consumer.

Figure 10:
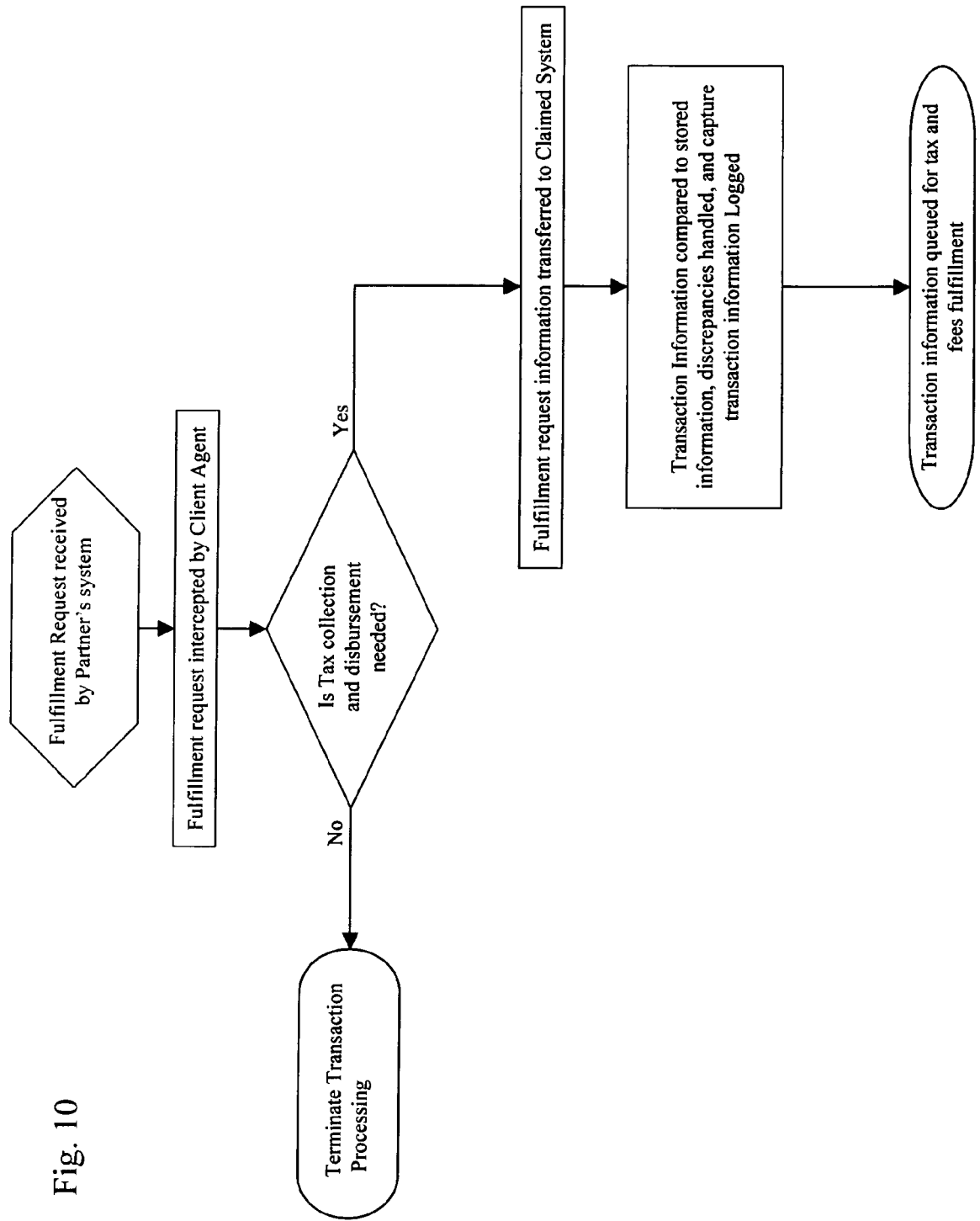
FIG. 10 depicts the process of the disclosed invention for the fulfillment process of advising the financial network of the transaction fulfillment and commencement of the fee collection phase.

FIG. 10 depicts an example of the process of the disclosed invention for the fulfillment and settlement process of advising the financial network of the transaction fulfillment and commencement of the settlement and fee collection phase. The fulfillment request may be intercepted by the Claimed System Client Agent, and, after verification that the transaction is of the sort that should undergo processing according to the claimed invention, it would be transferred to the Claimed System. The Claimed System Client Agent may process the batch file so as to prevent the underlying transaction from undergoing dual fulfillment and settlement processes. Such processing may include the removal of the underlying transaction from the subject matter batch file.

Within the Claimed System, an initial inquiry may be made whether a transaction is subject to Claimed System processing according to the claimed method. Such an inquiry may be, by way of example, of verifying whether or not the transaction data includes a previously integrated Claimed System unique identifier or by way of comparing the unique transaction identifier with a list of transaction identifiers that have previously undergone functionality of the claimed invention. The System may have mechanisms that will prevent performing claimed functionalities more than once on any single transaction. In such situations, the System would return the transaction to the standard fulfillment process.

A further inquiry may be made as to whether or not the respective Merchant has requested Claimed System fulfillment services only. Merchants may elect to use Claimed System fulfillment services only (alone) if, by way of example, they perform tax calculation or transaction authorization processes independent of those performed by the Claimed System.

The Claimed System may then create a unique fulfillment identifier, for further tracking, control and auditing purposes.

The Claimed System would then forward the fulfillment request for fulfillment processes and for fee collection and tax distribution purposes.

Figure 11:
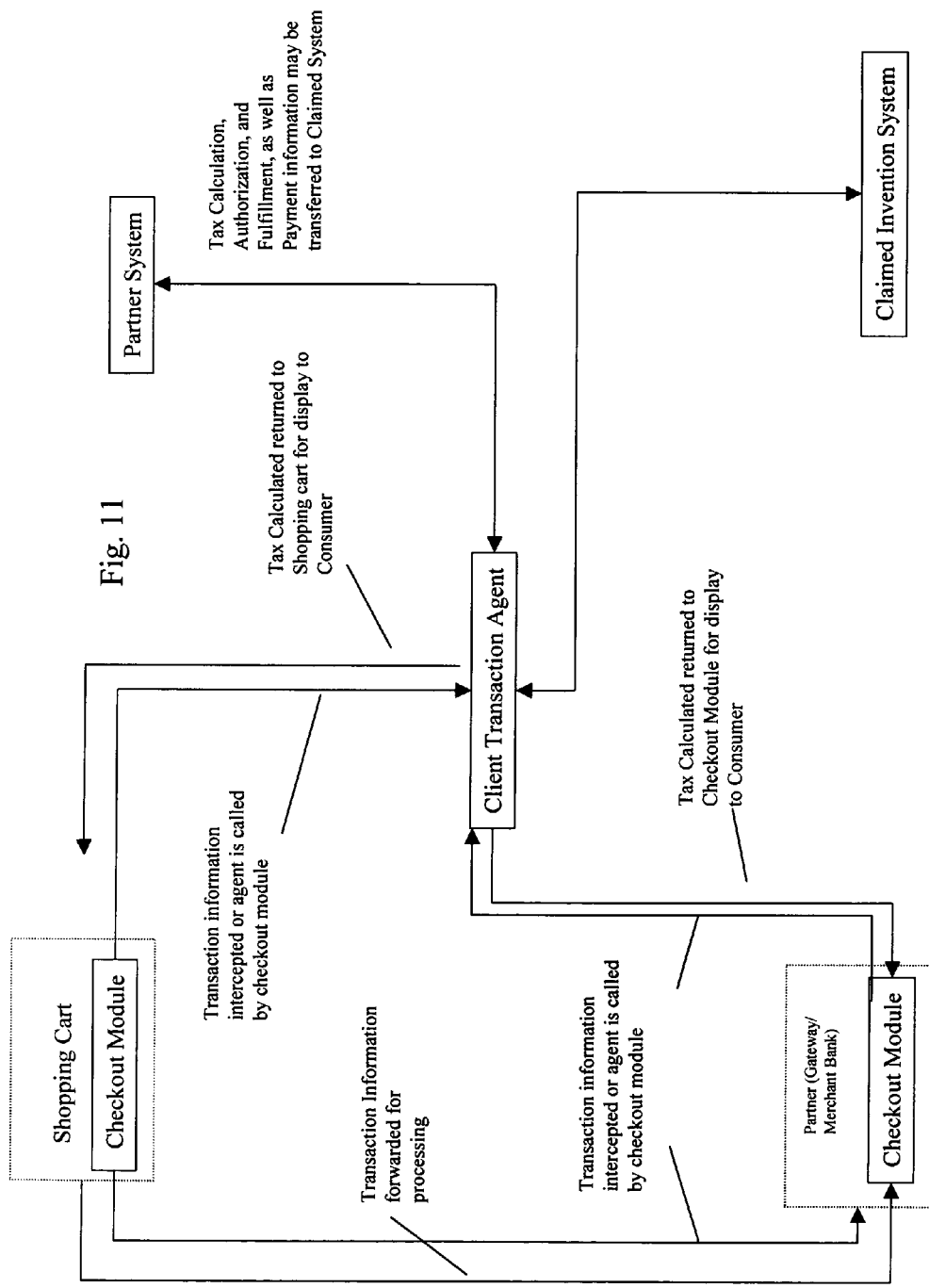
FIG. 11 depicts a high-level diagram of the Transaction Client Agent shown in FIG. 4 which implements the current invention along with basic inter-computer actions that occur in that environment and associated processing operations.

FIG. 11 depicts an overview of the Claimed System Client Agent as it would be implemented in certain embodiments of the claimed invention that require segregation between the systems of the client and those of the claimed invention. In different embodiments, the Claimed System client Transaction Agent is implemented at different phases of the transaction authorization flow, such as immediately after the transaction check-out module that is part of the Merchant's shopping cart, or in the systems of the gateway providing Internet gateway services to the merchant, or upon the systems of the acquirer bank. The Claimed System Client Transaction Agent may then interact with its point of integration for the purpose of intercepting transactions and transferring them to the system of the Claimed invention, for the performance of system functionalities, such as tax calculation. The Claimed System Client Transaction Agent may then return the transaction data, including data that may have been added in by the claimed system, such as tax data, to the point of integration for purpose of being forwarded for transaction authorization. The transaction client agent may also be called by the systems of the Merchant or the integration partner, in order to notify the Claimed System of transactions, requests and responses. In certain embodiments, only tax calculation requests need to be serviced in "real time" whereas in other embodiments (such as Authorization and Capture) the functionality is that of "notification" to Claimed System, and the of their processing by Claimed System is not relevant to the completion of the online sale transaction.

The Claimed System Client Transaction Agent may also intercept the transaction from the integration partner for the purpose of forwarding the transaction for further Claimed System functionality. The Check Out Module and the integration partner may be one and the same systems. Transaction flow performed by the transaction client agent is further depicted in FIG. 13.

Figure 12:
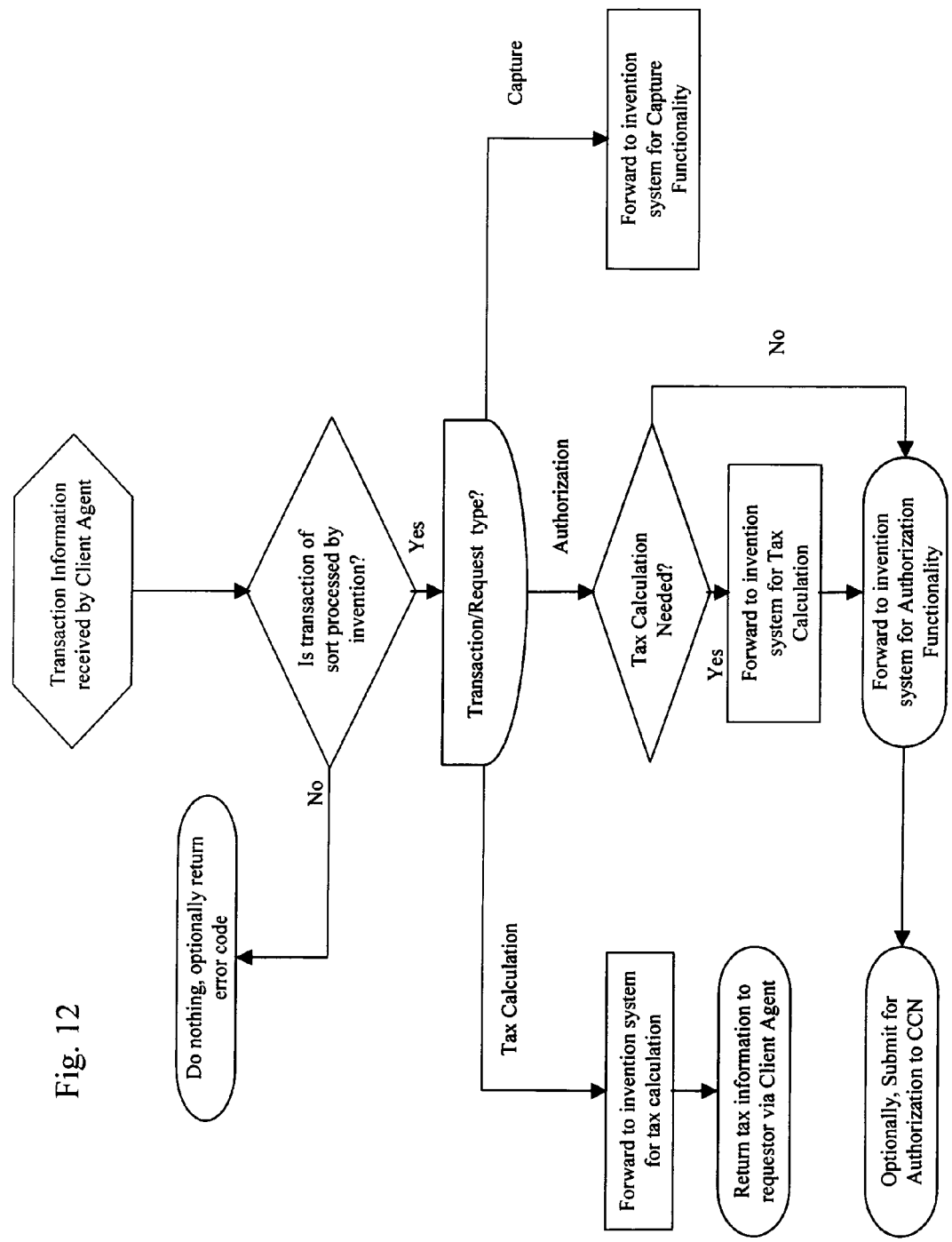
FIG. 12 depicts a high level diagram of basic processing threads performed by the Transaction Client Agent shown in FIG. 11.

FIG. 12 depicts some of the basic processing threads that would be performed by the Claimed System Client Transaction Agent shown in FIG. 11 in an embodiment of the Transaction Agent in a system for the calculation of sales tax on on-line transactions. As illustrated in this figure, a transaction would be intercepted by the Claimed System Client Transaction Agent, and a first inquiry may be made as to whether the transaction is of the sort that is typically supposed to undergo functionality typically performed by the Claimed System. If the answer is no, the transaction would be returned to the standard authorization process. A further inquiry may be made as to whether the transaction includes data that is typically added by the Claimed System, such as sales tax data that is pertinent to the underlying transaction. If the answer is no, the transaction would forwarded to the Claimed System for the purpose of performing the relevant functionalities, such as the calculation of tax. Once the relevant functionality is performed, the transaction would be returned to the Claimed System Transaction Agent, where a further inquiry would be made as to where the transaction should be directed—back to the system from which it was received or forwarded for further processing, such as authorization by the credit-card financial network. Once the transaction undergoes network functionality, such as authorization by the financial or credit card network, it would be further intercepted by the Claimed System Transaction Agent for the purpose of registering said functionality for auditing, control and management purposes, as well as further processing, such as tax disbursement and merchant billing.

Figure 13:
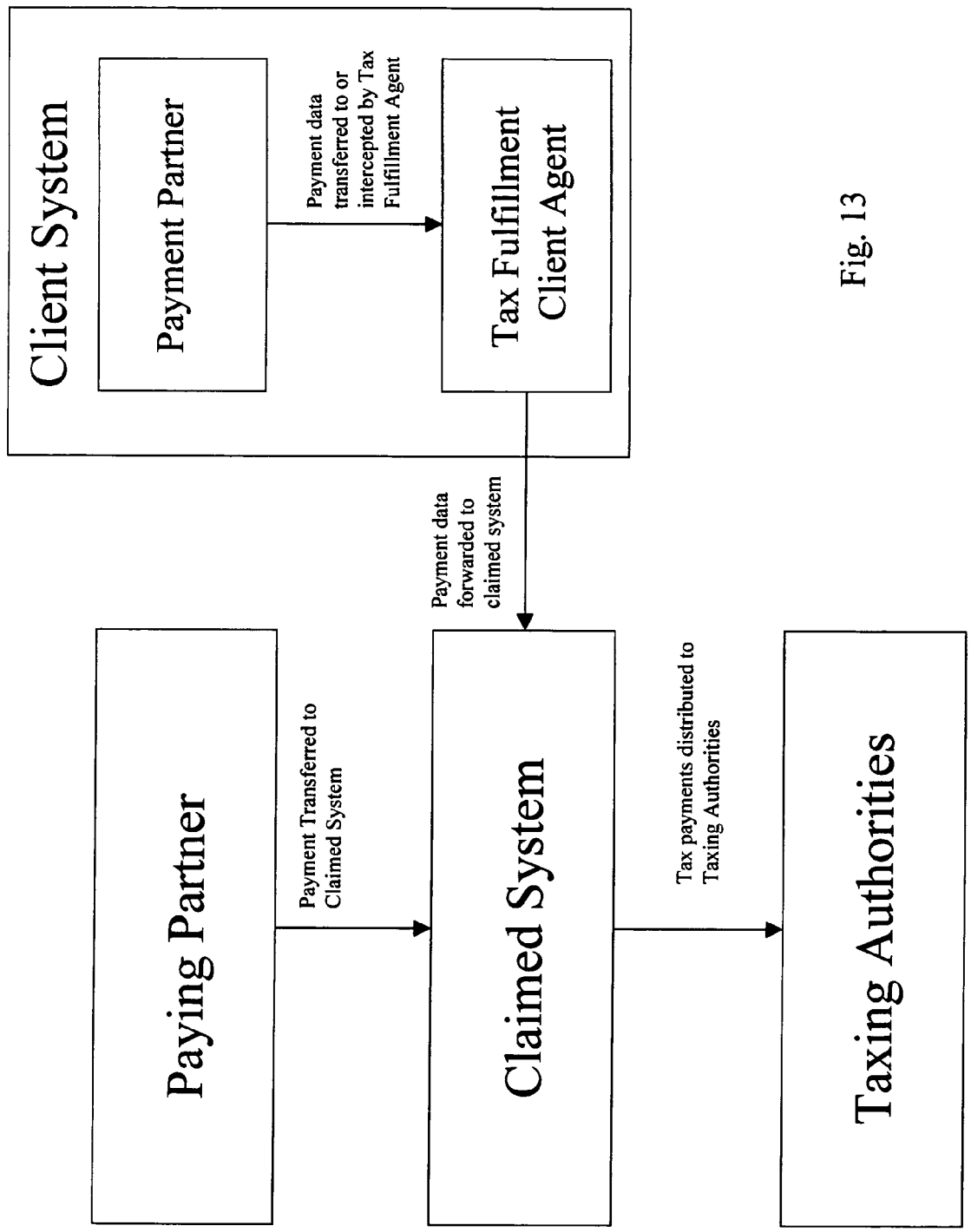
FIG. 13 depicts a high-level diagram of the Settlement Agent shown in FIG. 4 which implements the current invention along with basic inter-computer actions that occur in that environment and associated processing operations.

FIG. 13 depicts an exemplary overview of the Claimed System Tax Fulfillment Agent as such would be implemented in embodiments that require segregation between the client systems and the systems of the Claimed Invention that perform financial fulfillment and settlement functionalities. The Claimed System Client Tax Fulfillment Agent may be implemented at different phases of the transaction flow, such as immediately at the Internet Payment Processing Gateway, in the systems of the acquirer bank or those of the credit card association. In such embodiments, the Claimed System Client Settlement Agent would intercept fulfillment and settlement requests and forward these to the Claimed System for further processing, billing and distribution of proceeds, as required. The Claimed System Client Settlement Agent may also intercept, or advised by the partner of, the transfer of funds, and transfer these to the Claimed System for further processing, and the distribution of funds as required, such as the transfer of tax revenue to the respective taxing authorities.

Figure 14:
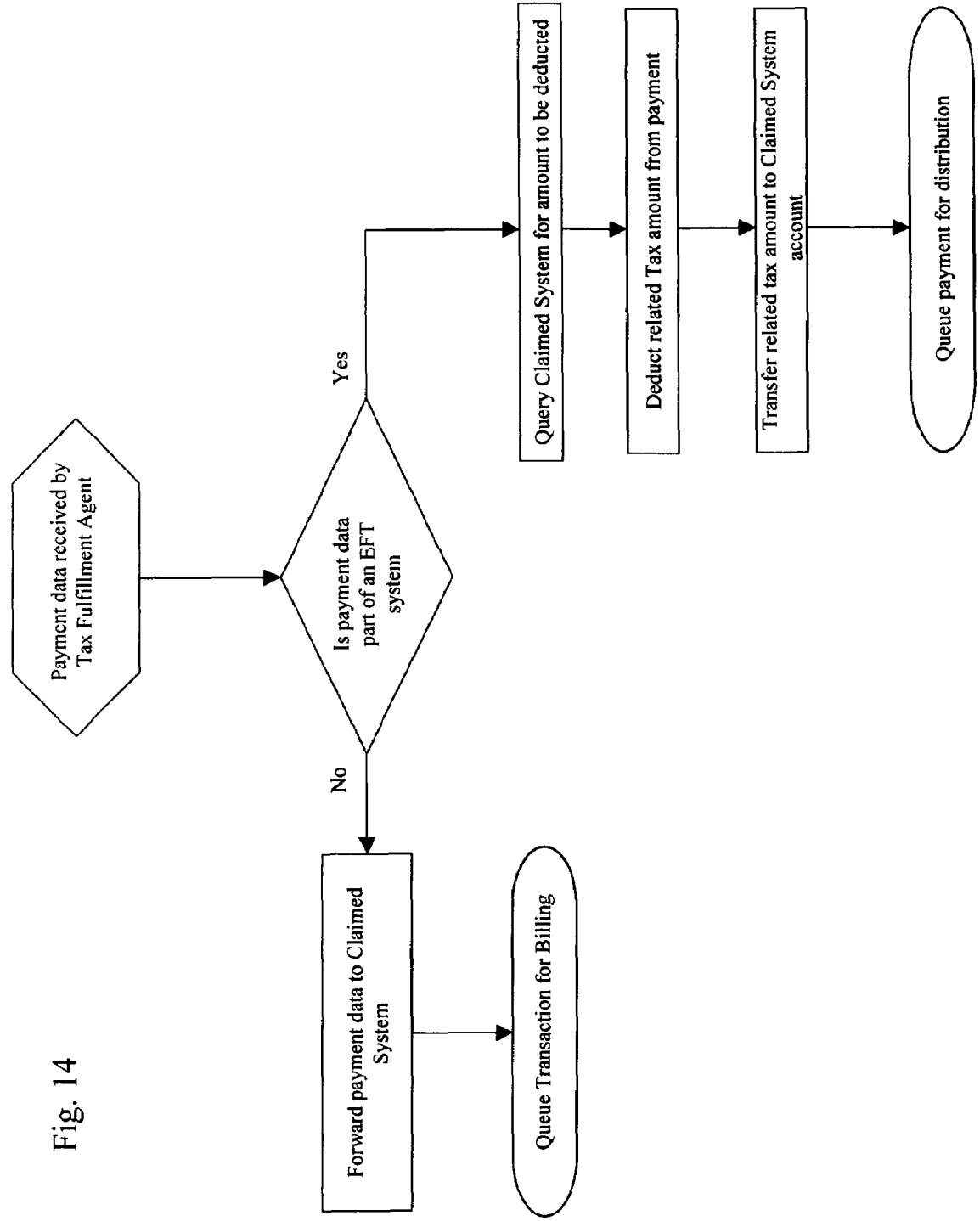
FIG. 14 depicts a high level diagram of basic processing threads performed by the Settlement Agent shown in FIG. 13.

FIG. 14 depicts the basic processing threads that would be performed by the Claimed System Client Fulfillment Agent depicted in FIG. 13. As illustrated in this figure, payment data may be intercepted by the Claimed System Client Fulfillment Agent, and a first inquiry would be made as to whether the payment data is part of an electronic fund transfer system. If the answer is yes, the Claimed System Client Fulfillment Agent would then query the Claimed System as to amounts that are to be deducted for the given transaction, such as tax revenue owing. The Claimed System Client Fulfillment Agent would then deduct said amounts, and forward them for distribution accordingly. If the payment data is not part of an electronic fund transfer system, the Claimed System Client Fulfillment Agent would forward the payment data to the Claimed System for billing and fee distribution using alternative methods, such as independent billing and invoicing of different clients, such as the Internet Payment Processing Gateway or invoicing the merchant directly.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

We claim:

1. A method for calculating, collecting and disbursing one or more third party payments owed to one or more third parties resulting from one or more transactions affected on a wide area network by a customer, wherein the transaction concerns a service and/or product provided by a merchant, the method comprising:

a) as a result of a customer affecting one or more electronic transactions for a product and/or service of a merchant, generating a first information packet on a first computer system on a first node of a wide area network, said first information packet containing transaction data;

b) determining on a computer system on said first node of a wide area network whether or not said transaction data contains third party payment data and, if not, adding third party payment data to said transaction data;

c) generating a second information packet, said second information packet containing said third party payment data;

d) transmitting said second information packet to a second computer system on a second node of said wide area network; and e) determining on a computer system on said first node of a wide area network whether or not said first or second transaction data contains one or more amounts owed to one or more third parties; and, if so, subtracting from transaction financial data said one or more amounts owed to said one or more third parties, and transmitting said one or more amounts owed to said one or more third parties; and, if not, not performing any further functionality on said transaction data.

2. The method according to claim 1) wherein said wide area network is the Internet.

3. The method according to claim 1) wherein at least one of said one or more third parties is a government agency.

4. The method according to claim 3) wherein at least one of said third party payments is a tax owed to said government agency.

5. The method according to claim 4) wherein said tax is selected from the group consisting of sales tax, use tax, and value added tax.

6. The method according to claim 1) wherein said step f) comprises the step of determining whether or not the consumer is exempt from paying said one or more third party payments on said transaction.

7. The method according to claim 6) further comprising the step of adding on a computer system on said first node of a wide area network transaction consumer data to at least one of said transaction data or said transaction financial data.

8. The method according to claim 6) wherein said third party payment data reflects no third party payment owed by the consumer.

9. The method according to claim 1) further comprising the step of determining on a computer system on said first node of a wide area network whether or not said merchant is exempt from paying said one or more third party payments on said transaction.

10. The method according to claim 9) further comprising the step of adding on a computer system on said first node of a wide area network merchant data to said transaction data.

11. The method according to claim 9) wherein third party payment data reflects no third party payment owed by the merchant.

12. The method according to claim 1) wherein at least one of said one or more third party payments is calculated based upon transaction data contained in said information packet.

13. The method according to claim 12) further comprising the step of applying on a computer system on said first node of a wide area network a predetermined mathematical formula to calculate said one or more third party payments.

14. The method according to claim 13) wherein at least one of said one or more third parties can directly modify said mathematical formula.

15. The method according to claim 1) wherein step a) comprises the step of generating said first information packet with billing software.

16. The method according to claim 1) wherein said financial data comprises data regarding the transfer of funds to at least one of said one or more third parties.

17. The method according to claim 16) wherein said transaction is selected from the group consisting of a credit card transaction, a debit card transaction, an electronic payment transaction, and an e-commerce payment transaction.

18. The method according to claim 1) wherein said transaction financial data indicates no amount is due to at least one of said one or more third parties.

19. The method according to claim 1) wherein said first computer system is a merchant system.

20. The method according to claim 19) wherein said merchant system comprises a point of sale.

21. The method according to claim 1) wherein said first computer system is an Internet Payment Processing Gateway system or a merchant system.

22. The method according to claim 1) wherein said second computer system is selected from the group consisting of an Internet Payment Processing Gateway system, a credit card association system, and a banking system.

23. The method according to claim 22) wherein said banking system is a credit card issuing bank or a merchant acquirer bank.

24. The method according to claim 1) wherein said third computer system is selected from the group consisting of an Internet Payment Processing Gateway system, a credit card association system, and a banking system.

25. The method according to claim 24) wherein said banking system is a credit card issuing bank or a merchant acquirer bank.

26. The method according to claim 1) wherein said fourth computer system is selected from the group consisting of a banking system, a credit card association system, an Internet Payment Processing Gateway system, and merchant system.

27. The method according to claim 26) wherein said banking system is a credit card issuing bank or a merchant acquirer bank.

* * * * *